US012687838B2

(12) United States Patent
Inaba et al.

(10) Patent No.: US 12,687,838 B2
(45) Date of Patent: Jul. 21, 2026

(54) SUBSTRATE PROCESSING APPARATUS, SUBSTRATE PROCESSING METHOD, TRAINING DATA GENERATING METHOD, TRAINING METHOD, TRAINING DEVICE, TRAINED MODEL GENERATING METHOD, AND TRAINED MODEL

(71) Applicant: SCREEN Holdings Co., Ltd., Kyoto (JP)

(72) Inventors: Masaki Inaba, Kyoto (JP); Masayuki Otsuji, Kyoto (JP); Ayumi Higuchi, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 563 days.

(21) Appl. No.: 17/926,746

(22) PCT Filed: Apr. 28, 2021

(86) PCT No.: PCT/JP2021/017042
§ 371 (c)(1),
(2) Date: Nov. 21, 2022

(87) PCT Pub. No.: WO2021/241124
PCT Pub. Date: Dec. 2, 2021

(65) Prior Publication Data
US 2023/0205178 A1 Jun. 29, 2023

(30) Foreign Application Priority Data
May 29, 2020 (JP) ................................. 2020-093858

(51) Int. Cl.
*G05B 19/4155* (2006.01)
*G06N 20/00* (2019.01)
(52) U.S. Cl.
CPC ......... *G05B 19/4155* (2013.01); *G06N 20/00* (2019.01); *G05B 2219/45031* (2013.01)

(58) Field of Classification Search
None
See application file for complete search history.

(56) References Cited

U.S. PATENT DOCUMENTS

| | | | |
|---|---|---|---|
| 8,399,357 B2 | 3/2013 | Ogawa et al. | |
| 10,256,163 B2 | 4/2019 | Printz et al. | |

(Continued)

FOREIGN PATENT DOCUMENTS

| | | |
|---|---|---|
| JP | 2010-067812 A | 3/2010 |
| JP | 2010-239014 A | 10/2010 |

(Continued)

OTHER PUBLICATIONS

International Search Report mailed Aug. 3, 2021 in corresponding PCT International Application No. PCT/JP2021/017042.

*Primary Examiner* — Sean Shechtman
(74) *Attorney, Agent, or Firm* — OSTROLENK FABER LLP

(57) ABSTRACT

A substrate processing apparatus includes a substrate holder, a processing liquid supply section, an input information acquiring section, a sublimation drying process condition information acquiring section, and a controller. The input information acquiring section acquires input information including at least one of substrate information and processing liquid information. The sublimation drying process condition information acquiring section acquires, from a trained model based on the input information, sublimation drying process condition information indicating a sublimation drying process condition on a processing target substrate. The controller controls the substrate holder and the processing liquid supply section to perform a sublimation drying process on the process target substrate based on the sublimation drying process condition acquired in the sublimation drying process condition information acquiring section.

3 Claims, 29 Drawing Sheets

(56) References Cited

U.S. PATENT DOCUMENTS

| | | | |
|---|---|---|---|
| 10,475,670 B2 | 11/2019 | Yoshihara et al. | |
| 11,056,370 B2 | 7/2021 | Ogawa et al. | |
| 11,124,869 B2 | 9/2021 | Sasaki et al. | |
| 11,139,180 B2 | 10/2021 | Yoshihara et al. | |
| 11,328,925 B2 | 5/2022 | Sasaki et al. | |
| 2012/0088357 A1 | 4/2012 | Ogawa et al. | |
| 2015/0270146 A1 | 9/2015 | Yoshihara et al. | |
| 2017/0141005 A1 | 5/2017 | Printz et al. | |
| 2018/0308715 A1 | 10/2018 | Yoshihara et al. | |
| 2019/0139791 A1* | 5/2019 | Kiyose | H01L 21/67034 |
| 2019/0189493 A1 | 6/2019 | Ogawa et al. | |
| 2019/0225521 A1 | 7/2019 | Heath | |
| 2019/0286075 A1 | 9/2019 | Yennie et al. | |
| 2019/0390320 A1 | 12/2019 | Sasaki et al. | |
| 2020/0033838 A1 | 1/2020 | Fujita et al. | |
| 2020/0035514 A1 | 1/2020 | Yoshihara et al. | |
| 2020/0075315 A1 | 3/2020 | Yoshimizu et al. | |
| 2020/0152447 A1 | 5/2020 | Sasaki et al. | |
| 2020/0234980 A1* | 7/2020 | Hanawa | H01L 21/67034 |
| 2021/0324509 A1 | 10/2021 | Sasaki et al. | |

FOREIGN PATENT DOCUMENTS

| | | | | | |
|---|---|---|---|---|---|
| JP | | 2012-080033 A | 4/2012 | | |
| JP | | 2014-150139 A | 8/2014 | | |
| JP | | 2015-185806 A | 10/2015 | | |
| JP | | 2018-022830 A | 2/2018 | | |
| JP | | 2018-139331 A | 9/2018 | | |
| JP | | 2018-534783 A | 11/2018 | | |
| JP | | 2019-046927 A | 3/2019 | | |
| JP | WO 2019/053988 | | * | 3/2019 | H01L 21/02057 |
| JP | | 2020-004948 A | 1/2020 | | |
| JP | | 2020-038888 A | 3/2020 | | |
| JP | | 2020-077826 A | 5/2020 | | |
| TW | | 201946136 A | 12/2019 | | |
| WO | WO 2019/239727 A1 | | 12/2019 | | |
| WO | WO 2020/004547 A1 | | 1/2020 | | |

* cited by examiner

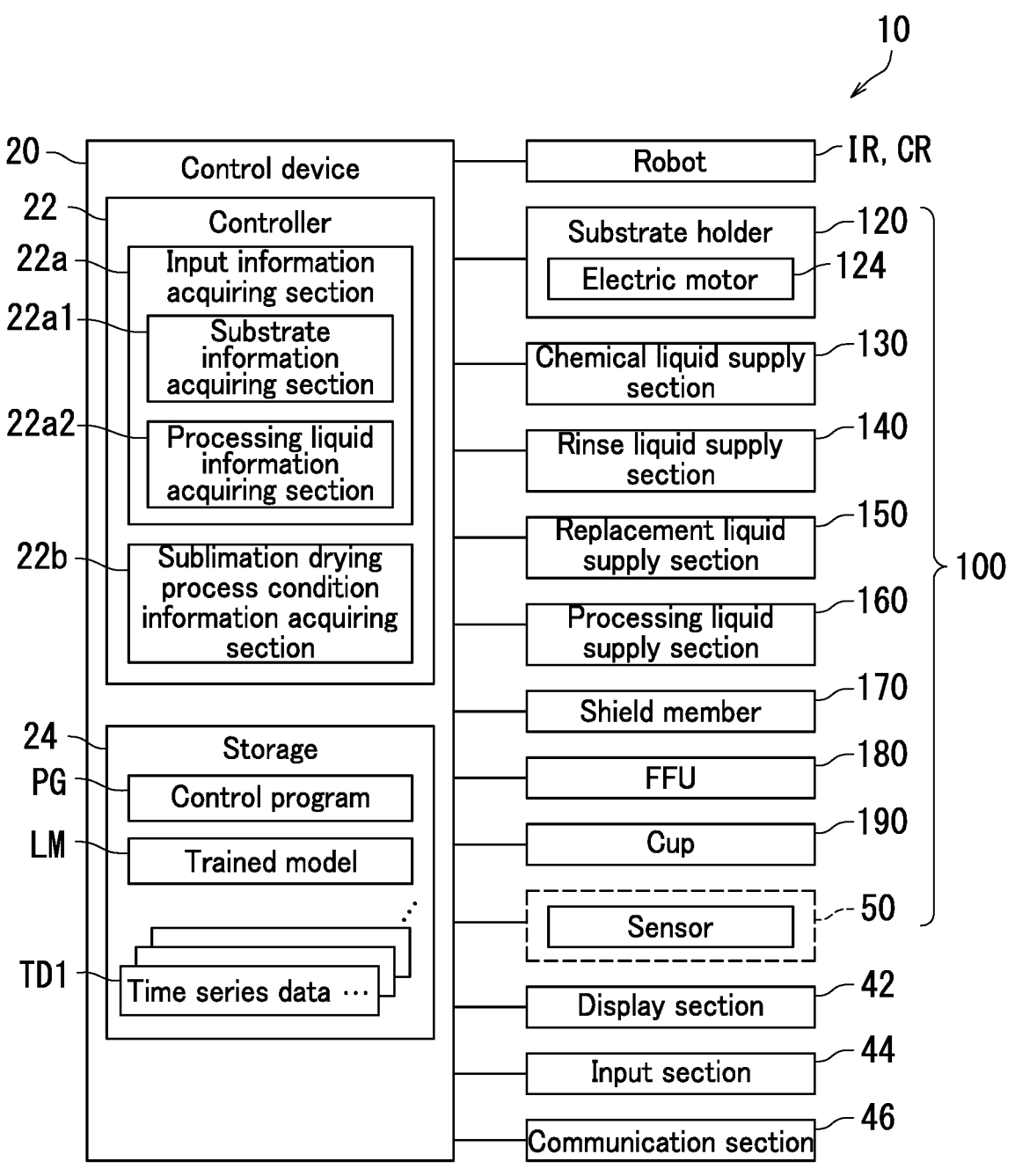

10

20 — Control device

22 — Controller

22a — Input information acquiring section

22a1 — Substrate information acquiring section

22a2 — Processing liquid information acquiring section

22b — Sublimation drying process condition information acquiring section

24 — Storage

PG — Control program

LM — Trained model

TD1 — Time series data ···

IR, CR — Robot

Substrate holder — 120

Electric motor — 124

Chemical liquid supply section — 130

Rinse liquid supply section — 140

Replacement liquid supply section — 150

Processing liquid supply section — 160

Shield member — 170

FFU — 180

Cup — 190

Sensor — 50

Display section — 42

Input section — 44

Communication section — 46

|  | Substrate information | Processing liquid information | Sublimation drying process condition | Processing result |
|---|---|---|---|---|
| LD1 | La1 | Lb1 | Ls1 | Good |
| LD2 | La2 | Lb2 | Ls2 | Poor |
| LD3 | La3 | Lb3 | Ls3 | Poor |
| LD4 | La4 | Lb4 | Ls4 | Good |
| ⋮ | ⋮ | ⋮ | ⋮ | ⋮ |
| LD1000 | La1000 | Lb1000 | Ls1000 | Good |

LD

| | Substrate information | | | | | Processing liquid information | Sublimation drying process condition | Pro-cessing result |
|---|---|---|---|---|---|---|---|---|
| | Groove depth | Groove width | Aspect ratio | Compo-sition | Pattern arrange-ment | | | |
| LD1 | Lad1 | Law1 | Laa1 | Lam1 | Lap1 | Lb1 | Ls1 | Good |
| LD2 | Lad2 | Law2 | Laa2 | Lam2 | Lap2 | Lb2 | Ls2 | Poor |
| LD3 | Lad3 | Law3 | Laa3 | Lam3 | Lap3 | Lb3 | Ls3 | Poor |
| LD4 | Lad4 | Law4 | Laa4 | Lam4 | Lap4 | Lb4 | Ls4 | Good |
| ⋮ | ⋮ | ⋮ | ⋮ | ⋮ | ⋮ | ⋮ | ⋮ | ⋮ |
| LD1000 | Lad1000 | Law1000 | Laa1000 | Lam1000 | Lap1000 | Lb1000 | Ls1000 | Good |

LD

| | Substrate information | | | Processing liquid information | Sublimation drying process condition | Pro-cessing result |
|---|---|---|---|---|---|---|
| | Chemical liquid concentration | Chemical liquid temperature | Supply amount of chemical liquid | | | |
| LD1 | Lac1 | Lat1 | Lav1 | Lb1 | Ls1 | Good |
| LD2 | Lac2 | Lat2 | Lav2 | Lb2 | Ls2 | Poor |
| LD3 | Lac3 | Lat3 | Lav3 | Lb3 | Ls3 | Poor |
| LD4 | Lac4 | Lat4 | Lav4 | Lb4 | Ls4 | Good |
| ⋮ | ⋮ | ⋮ | ⋮ | ⋮ | ⋮ | ⋮ |
| LD1000 | Lac1000 | Lat1000 | Lav1000 | Lb1000 | Ls1000 | Good |

LD

| | Substrate information | Processing liquid information | | Sublimation drying process condition | Pro-cessing result |
|---|---|---|---|---|---|
| | | Processing liquid concentration | Processing liquid temperature | | |
| LD1 | Lac1 | Lbc1 | Lbt1 | Ls1 | Good |
| LD2 | Lac2 | Lbc2 | Lbt2 | Ls2 | Poor |
| LD3 | Lac3 | Lbc3 | Lbt3 | Ls3 | Poor |
| LD4 | Lac4 | Lbc4 | Lbt4 | Ls4 | Good |
| ⋮ | ⋮ | ⋮ | ⋮ | ⋮ | ⋮ |
| LD1000 | Lac1000 | Lbc1000 | Lbt1000 | Ls1000 | Good |

LD

| | Substrate information | Processing liquid information | Sublimation drying process condition | | | | Pro-cessing result |
|---|---|---|---|---|---|---|---|
| | | | Supply amount of processing liquid | Processing liquid discharge pattern | Rotation speed | Flow rate of inert gas | |
| LD1 | La1 | Lb1 | Lsv1 | Lsi1 | Lsr1 | Lsn1 | Good |
| LD2 | La2 | Lb2 | Lsv2 | Lsi2 | Lsr2 | Lsn2 | Poor |
| LD3 | La3 | Lb3 | Lsv3 | Lsi3 | Lsr3 | Lsn3 | Poor |
| LD4 | La4 | Lb4 | Lsv4 | Lsi4 | Lsr4 | Lsn4 | Good |
| ⋮ | ⋮ | ⋮ | ⋮ | ⋮ | ⋮ | ⋮ | ⋮ |
| LD1000 | La1000 | Lb1000 | Lsv1000 | Lsi1000 | Lsr1000 | Lsn1000 | Good |

FIG. 18

| Sublimation drying process condition | | | |
|---|---|---|---|
| Supply amount of processing liquid | Ejecting pattern | Rotation speed | Flow rate of inert gas |
| Rsv | Rsi | Rsr | Rsn |

LD

| | Substrate information | Processing liquid information | Sublimation drying process condition | Processing result |
|---|---|---|---|---|
| | | | | Collapse rate |
| LD1 | La1 | Lb1 | Ls1 | 32% |
| LD2 | La2 | Lb2 | Ls2 | 2% |
| LD3 | La3 | Lb3 | Ls3 | 5% |
| LD4 | La4 | Lb4 | Ls4 | 1% |
| ⋮ | ⋮ | ⋮ | ⋮ | ⋮ |
| LD1000 | La1000 | Lb1000 | Ls1000 | 0% |

LD

| | Substrate information | Processing liquid information | | Sublimation drying process condition | Pro- cessing result |
|---|---|---|---|---|---|
| | | Processing liquid concentration profile | Processing liquid temperature profile | | |
| LD1 | La1 | Lbp1 | Lbq1 | Ls1 | Good |
| LD2 | La2 | Lbp2 | Lbq2 | Ls2 | Poor |
| LD3 | La3 | Lbp3 | Lbq3 | Ls3 | Poor |
| LD4 | La4 | Lbp4 | Lbq4 | Ls4 | Good |
| ⋮ | ⋮ | ⋮ | ⋮ | ⋮ | ⋮ |
| LD1000 | La1000 | Lbp1000 | Lbq1000 | Ls1000 | Good |

LD

| | Substrate infor- mation | Proces- sing liquid infor- mation | Sublimation drying process condition | | | | | Pro- cessing result |
|---|---|---|---|---|---|---|---|---|
| | | | Supply amount of proces- sing liquid | Processing liquid ejenting pattern | Substrate temper- ature | Rotation speed profile | Inert gas profile | |
| LD1 | La1 | Lb1 | Lsv1 | Lsi1 | Lst1 | Lsr1 | Lsn1 | Good |
| LD2 | La2 | Lb2 | Lsv2 | Lsi2 | Lst2 | Lsr2 | Lsn2 | Poor |
| LD3 | La3 | Lb3 | Lsv3 | Lsi3 | Lst3 | Lsr3 | Lsn3 | Poor |
| LD4 | La4 | Lb4 | Lsv4 | Lsi4 | Lst4 | Lsr4 | Lsn4 | Good |
| ⋮ | ⋮ | ⋮ | ⋮ | ⋮ | ⋮ | ⋮ | ⋮ | ⋮ |
| LD1000 | La1000 | Lb1000 | Lsv1000 | Lsi1000 | Lst1000 | Lsr1000 | Lsn1000 | Good |

| | Substrate information | Processing liquid information | Sublimation drying process condition |
|---|---|---|---|
| | Groove depth | Processing liquid concentration | |
| CT1 | Ad1 | Bc1 | Rp1 |
| CT2 | Ad2 | Bc2 | Rp2 |
| CT3 | Ad3 | Bc3 | Rp3 |
| CT4 | Ad4 | Bc4 | Rp4 |
| ⋮ | ⋮ | ⋮ | ⋮ |
| CT1000 | Ad1000 | Bc1000 | Rp1000 |

SUBSTRATE PROCESSING APPARATUS, SUBSTRATE PROCESSING METHOD, TRAINING DATA GENERATING METHOD, TRAINING METHOD, TRAINING DEVICE, TRAINED MODEL GENERATING METHOD, AND TRAINED MODEL

CROSS-REFERENCES TO RELATED APPLICATIONS

The present application is a 35 U.S.C. §§ 371 national stage application of International Application No. PCT/JP2021/017042 filed Apr. 28, 2021, which claims priority to Japanese Patent Application No. 2020-093858, filed May 29, 2020, the contents of which are incorporated herein by reference.

TECHNICAL FIELD

The present invention relates to a substrate processing apparatus, a substrate processing method, a training data generating method, a training method, a training device, a trained model generating method, and a trained model.

BACKGROUND ART

A substrate processing apparatus for processing substrates is suitably used for manufacturing semiconductor devices and the like. In the process of manufacturing semiconductor devices, a pattern of grooves and structures may be formed in a substrate. A semiconductor device including three-dimensional memory cells can be manufactured by, for example, forming a pattern of grooves in a laminated structure supported in a base of a substrate to form a plurality of memory cells in each of the grooves.

Chemical liquid processing for such a substrate provided with a pattern of grooves and structures may cause collapse of the pattern in the substrate as the chemical liquid dries. It has therefore been studied to supply a substrate with a processing liquid containing a substance that sublimes after the substrate is processed with a chemical liquid, thereby preventing the collapse of the pattern in the substrate (see Patent Document 1).

In the method of Patent Document 1, concavities in the substrate are filled with a solution containing a solvent and a substance that sublimes, and then filled with a solid-state substance that sublimes, after evaporation of the solution. The substrate is subsequently heated to a temperature higher than a sublimation temperature of the substance that sublimes, in order to sublimate the substance that sublimes. The substance that sublimes is consequently removed from the substrate, thereby preventing the collapse of the pattern in the substrate as well as drying the substance.

CITATION LIST

Patent Document

Patent Document 1: JP 2018-139331 A

SUMMARY OF INVENTION

Technical Problem

The method of Patent Document 1 may however have difficulty in supplying an appropriate amount of the solution containing the substance that sublimes. Too little amount of solution containing the substance that sublimes may cause the thickness of the substance that sublimes to be reduced with respect to the depth of the concavities, which may cause the collapse of the pattern in the substrate. Too much amount of solution containing the substance that sublimes may cause increases in cost and processing time.

The present invention has been achieved in view of the above circumstances, and an object thereof is to provide a substrate processing apparatus, a substrate processing method, a training data generating method, a training method, a training device, a trained model generating method, and a trained model, capable of properly drying a process target substrate while suppressing collapse of a pattern of structures in the process target substrate.

Solution to Problem

A substrate processing apparatus according to an aspect of the present invention includes a substrate holder, a processing liquid supply section, an input information acquiring section, a sublimation drying process condition information acquiring section, and a controller. The substrate holder holds a process target substrate with the process target substrate allowed to rotate freely. The process target substrate is provided with a pattern of grooves and structures. The processing liquid supply section supplies a processing liquid to the process target substrate. The processing liquid contains a solvent and a substance to sublime. The input information acquiring section acquires input information including at least one of both substrate information and processing liquid information. The substrate information is information on the process target substrate and indicates an attribute or a forming condition of the grooves and the structures. The processing liquid information indicates an attribute of the processing liquid. The sublimation drying process condition information acquiring section acquires sublimation drying process condition information from a trained model based on the input information. The sublimation drying process condition information indicates a sublimation drying process condition for the process target substrate. The controller controls the substrate holder and the processing liquid supply section to perform a sublimation drying process on the process target substrate based on the sublimation drying process condition information acquired in the sublimation drying process condition information acquiring section. The trained model is constituted by machine learning on training data that is associated with: at least one of both substrate information and processing liquid information, the substrate information being information on a learning target substrate provided with a pattern of grooves and structures and indicating an attribute or a forming condition of the grooves and structures, the processing liquid information indicating an attribute of a processing liquid used for performance of the sublimation drying process on the learning target substrate, the processing liquid containing a solvent and a substance to sublime; sublimation drying process condition information indicating a condition by which the sublimation drying process has been performed on the learning target substrate; and process result information indicating results of the sublimation drying process that has been performed on the learning target substrate with the processing liquid.

In an embodiment, the substrate processing apparatus further includes storage that stores the trained model.

In an embodiment, the substrate information includes information on each of the process target substrate and the learning target substrate and indicates any of depth of grooves, width of grooves, and an aspect ratio of grooves.

In an embodiment, the processing liquid information includes information on the process target substrate, which indicates any of a concentration or a temperature of the substance to sublime, in the processing liquid. The processing liquid information includes information on the learning target substrate, which indicates any of a concentration or a temperature of the substance that to sublimes, in the processing liquid.

In an embodiment, the sublimation drying process condition information includes information on the process target substrate, which indicates any of a supply amount of the processing liquid, an ejecting pattern of the processing liquid, and a rotation speed of the substrate. The sublimation drying process condition information includes information on the learning target substrate, which indicates any of a supply amount of the processing liquid, an ejecting pattern of the processing liquid, and a rotation speed of the substrate.

In an embodiment, the input information includes temperature information indicating a temperature of the process target substrate in the sublimation drying process.

A substrate processing method according to another aspect of the present invention comprises: holding a process target substrate with the substrate allowed to rotate freely, the process target substrate being provided with a pattern of grooves and structures; acquiring input information including at least one of both substrate information and processing liquid information, the substrate information being information on the process target substrate and indicating an attribute or a forming condition of the grooves and the structures, the processing liquid information indicating an attribute of a processing liquid containing a solvent and a substance to sublime; acquiring sublimation drying process condition information from a trained model based on the input information, the sublimation drying process condition information indicating a sublimation drying process condition for the process target substrate; and performing a sublimation drying process on the process target substrate according to a sublimation drying process condition of the sublimation drying process condition information, wherein in the acquiring sublimation drying process condition information, the trained model is constituted by performing machine learning on training data which is associated with: at least one of both substrate information and processing liquid information, the substrate information being information on a learning target substrate provided with a pattern of grooves and structures and indicating an attribute or a forming condition of the grooves and structures, the processing liquid information indicating an attribute of a processing liquid used for performance of a sublimation drying process on the learning target substrate, the processing liquid containing a solvent and a substance to sublime; sublimation drying process condition information indicating a condition by which the sublimation drying process has been performed on the learning target substrate; and process result information indicating a result of the sublimation drying process that has been performed on the learning target substrate.

A training data generating method according to still another aspect of the present invention includes: acquiring at least one of both substrate information and processing liquid information from time series data, the time series data being output from a substrate processing apparatus that process a learning target substrate provided with a pattern of groves and structures, the substrate information indicating an attribute or a forming condition of the grooves and structures, the processing liquid information indicating an attribute of a processing liquid used for performance of a sublimation drying process on the learning target substrate, the processing liquid containing a solvent and a substance to sublime; acquiring sublimation drying process condition information from the time series data, the sublimation drying process condition information indicating a sublimation drying process condition during performance of the sublimation drying process on the learning target substrate in the substrate processing apparatus; acquiring process result information from the time series data, the process result information indicating a result of performance of a sublimation drying process on the learning target substrate in the substrate processing apparatus; storing training data on the learning target substrate in storage, the training data being obtained by associating: at least one of both the substrate information and the processing liquid information; the sublimation drying process condition information; and the processing result information.

A training method according to still another aspect of the present invention includes: acquiring training data generated according to the training data generating method described above; and inputting the training data to a learning program to perform machine learning on the training data.

A training device according to still another aspect of the present invention includes: storage that stores training data generated according to the training data generating method described above; and a training section that inputs the training data to a learning program to perform machine learning on the training data.

A trained model generating method according to still another aspect of the present invention includes: acquiring training data generated according to the training data generating method described above; and performing machine learning on the training data to generate a trained model.

A trained model according to still another aspect of the present invention constructed through performance of machine learning on training data generated according to the training data generating method described above A substrate processing apparatus according to still another aspect of the present invention includes: a substrate holder that holds a substrate with the substrate allowed to rotate freely, the substrate being provided with a pattern of grooves and structures; a processing liquid supply section that supplies a processing liquid to the substrate, the processing liquid containing a solvent and a substance to sublime; storage that stores a conversion table obtained by associating: at least one of both substrate information and processing liquid information, the substrate information indicating an attribute or a forming condition of grooves and structures, the processing liquid information indicating an attribute of a processing liquid containing a solvent and a substance to sublime, and sublimation drying process condition information indicating a sublimation drying process condition; an input information acquiring section that acquires input information, the input information being at least one of both substrate information and processing liquid information, substrate information being information on the substrate and indicating an attribute or a forming condition of the grooves and the structures, the processing liquid information indicating an attribute of the processing liquid supplied in the processing liquid supply section; a sublimation drying process condition information acquiring section that acquires a sublimation drying process condition information using the conversion table based on the input information, the sublimation drying process condition information indicating a sublimation drying process condition for the substrate; and a controller that controls the substrate holder and the processing liquid supply section to perform a sublimation drying process on the substrate based on the sublimation drying process condition acquired in the sublimation drying process condition information acquiring section.

Advantageous Effects of Invention

The present invention is capable of properly drying the process target substrate while suppressing the collapse of the pattern of structures in the process target substrate.

BRIEF DESCRIPTION OF DRAWINGS

FIG. 4 is a block diagram of the substrate processing system provided with the substrate processing apparatus according to the present embodiment.

FIG. 18 is a diagram illustrating training data to be entered into the training device according to the present embodiment.

FIG. 25 is a diagram illustrating training data to be entered into the training device according to the present embodiment.

DESCRIPTION OF EMBODIMENTS

Figure 1:
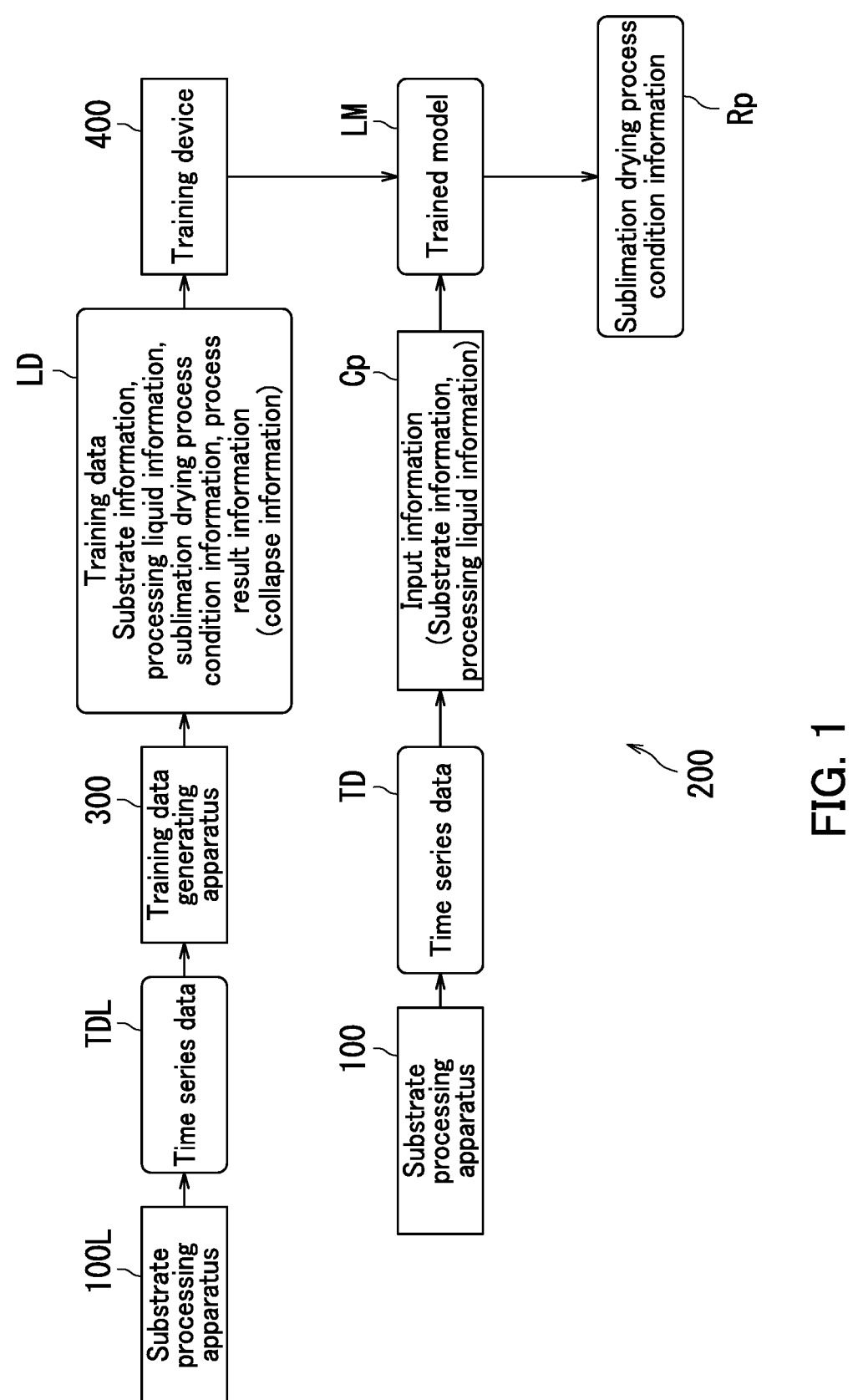
FIG. 1 is a schematic diagram of a substrate processing learning system provided with a substrate processing apparatus according to an embodiment.

The following describes a substrate processing apparatus, a substrate processing method, a training data generating method, a training method, a training device, a trained model generating method, and a trained mode, according to an embodiment of the present invention with reference to the accompanying drawings. Note that elements which are the same or equivalent are labeled the same reference signs in the drawings and description thereof is not repeated. Furthermore, in the present specification, X, Y, and Z axes of a three-dimensional orthogonal coordinate system may be added to facilitate understanding of the embodiments of the present invention. Typically, the X and Y directions are parallel to the horizontal direction and the Z direction is parallel to the vertical direction.

A substrate processing learning system 200 including a substrate processing apparatus 100 according to the present embodiment will be described with reference to FIG. 1. FIG. 1 is a schematic diagram of the substrate processing learning system 200.

As illustrated in FIG. 1, the substrate processing learning system 200 includes the substrate processing apparatus 100, a substrate processing apparatus 100L, a training data generating apparatus 300, and a training device 400.

The substrate processing apparatus 100 processes a substrate to be processed. Here, the substrate to be processed is provided with a pattern of grooves and structures. The substrate processing apparatus 100 performs a sublimation drying process for the substrate to be processed. Note that the substrate processing apparatus 100 may perform a process other than the sublimation drying process for the substrate to be processed. The substrate processing apparatus 100 is a single-wafer type that processes substrates to be processed one by one. Typically, the substrate to be processed is in the shape of a disc.

The substrate processing apparatus 100L processes a substrate to be learned. Here, the substrate to be learned is provided with a pattern of grooves and structures. The substrate processing apparatus 100L performs a sublimation drying process on the substrate to be learned. Note that the substrate processing apparatus 100L may perform a process other than the sublimation drying process on the substrate to be learned. The configuration of the substrate to be learned is the same as the configuration of the substrate to be processed. The substrate processing apparatus 100L is a single-wafer type that processes substrates to be processed one by one. Typically, the substrate to be processed is in the shape of a disc. The configuration of the substrate processing apparatus 100L is the same as the configuration of the substrate processing apparatus 100. The substrate processing apparatus 100L may be the same as the substrate processing apparatus 100. For example, one substrate processing apparatus may process a substrate to be learned in the past and then process a substrate to be processed. Alternatively, the substrate processing apparatus 100L may be another product with the same configuration as the substrate processing apparatus 100.

In the following description of the present specification, the substrate to be learned may be referred to as a "learning target substrate WL", and the substrate to be processed may be referred to as a "process target substrate Wp". Further, when it is not necessary to distinguish between the learning target substrate WL and the process target substrate Wp, the learning target substrate WL or the process target substrate Wp may be referred to as a "substrate W".

Examples of the substrate W include a semiconductor wafer, a liquid-crystal display substrate, a plasma display substrate, a field emission display (FED) substrate, an optical disk substrate, a magnetic disk substrate, a magneto-optical disk substrate, a photomask substrate, a ceramic substrate, and a solar cell substrate.

The substrate processing apparatus 100L outputs time series data TDL. The time series data TDL indicates temporal changes in physical quantities in the substrate processing apparatus 100L. The time series data TDL indicates temporal changes in physical quantities (values) representing time series variation over a predetermined period of time. For example, the time series data TDL indicates temporal changes in physical quantities about a process performed on the learning target substrate by the substrate processing apparatus 100L. Alternatively, the time series data TDL indicates temporal changes in physical quantities about the characteristics of the learning target substrate processed by the substrate processing apparatus 100L. Otherwise, the time series data TDL may include data indicating a manufacturing process before the learning target substrate is processed by the substrate processing apparatus 100L.

Note that values indicated in the time series data TDL may be values directly measured by a measuring device. Alternatively, the values indicated in the time series data TDL may also be values obtained by arithmetically processing values directly measured by a measuring device. Otherwise, the values indicated in the time series data TDL may be values obtained by calculating respective values measured by a plurality of measuring devices.

The training data generating apparatus 300 generates training data LD based on the time series data TDL or at least part of the time series data TDL. The training data generating apparatus 300 outputs the training data LD.

The training data LD is information on a learning target substrate(s) WL and includes: at least one of both processing liquid information and substrate information; sublimation drying process condition information; and process result information. The substrate information on the learning target substrate WL indicates an attribute or a forming condition of grooves and structures in the learning target substrate WL. The substrate information may be information on the learning target substrate WL measured before the sublimation drying process is performed on the learning target substrate WL. For example, the substrate information may be information obtained from the learning target substrate WL before it is loaded into the substrate processing apparatus 100L. Alternatively, the substrate information may be information about a process performed on the learning target substrate WL before the sublimation drying process is performed thereon.

The processing liquid information indicates an attribute of a processing liquid used for the sublimation drying process performed on the learning target substrate WL. Here, the processing liquid contains a solvent and a substance to sublime. The sublimation drying process condition information indicates a process condition by which a sublimation drying process has been performed on the learning target substrate WL. The process result information indicates the result of the sublimation drying process that has been performed on the learning target substrate WL. The process result information includes collapse information indicating the collapse of the pattern of structures.

The training device 400 performs machine learning on the training data LD, thereby generating a trained model LM. The training device 400 outputs the trained model LM.

The substrate processing apparatus 100 outputs time series data TD. The time series data TD indicates temporal changes in physical quantities in the substrate processing apparatus 100. The time series data TD indicates temporal changes in physical quantities (values) representing time series variations over a predetermined period of time. For example, the time series data TD indicates temporal changes in physical quantities about a process performed on the process target substrate by the substrate processing apparatus 100. Alternatively, the time series data TD indicates temporal changes in physical quantities about the characteristics of the process target substrate processed by the substrate processing apparatus 100.

Note that values indicated in the time series data TD may be values directly measured by a measuring device. Alternatively, the values indicated in the time series data TD may also be values obtained by arithmetically processing values directly measured by a measuring device. Otherwise, the values indicated in the time series data TD may be values obtained by calculating respective values measured by a plurality of measuring devices. The time series data TD may include data indicating a manufacturing process before a process target substrate is processed by the substrate processing apparatus 100.

An object to be used by the substrate processing apparatus 100 corresponds to an object to be used by the substrate processing apparatus 100L. The configuration of the object to be used by the substrate processing apparatus 100 is therefore the same as the configuration of the object to be used by the substrate processing apparatus 100L. In the time series data TD, the physical quantity of the object to be used by the substrate processing apparatus 100 also corresponds to the physical quantity of the object to be used by the substrate processing apparatus 100L. The physical quantity of the object to be used by the substrate processing apparatus 100L is therefore the same as the physical quantity of the object to be used by the substrate processing apparatus 100.

Input information Cp about the process target substrate Wp is generated from the time series data TD. The input information Cp on the process target substrate Wp is infor- mation on the process target substrate Wp and includes at least one of both substrate information and processing liquid information. The substrate information on the process target substrate Wp indicates an attribute or a forming condition of grooves and structures in the process target substrate Wp. The processing liquid information indicates an attribute of a processing liquid that is used for a sublimation drying process on the process target substrate Wp. Here, the pro- cessing liquid contains a solvent and a substance to sublime.

The input information Cp on the process target substrate Wp may be acquired by measuring the process target sub- strate Wp before the sublimation drying process is per- formed on the process target substrate Wp. Alternatively, the input information Cp may be acquired before the process target substrate Wp is loaded into the substrate processing apparatus 100. The input information Cp may be informa- tion about a process performed on the process target sub- strate Wp before the sublimation drying process is per- formed thereon, for example.

Sublimation drying process condition information Rp is output from the trained model LM based on the input information Cp on the process target substrate Wp. Here, the sublimation drying process condition information Rp indi- cates a sublimation drying process condition suitable for the process target substrate Wp in the substrate processing apparatus 100.

The training device 400 according to the present embodi- ment performs machine learning as described above with reference to FIG. 1. A highly accurate trained model LM can therefore be generated from time series data TDL that is extremely complex and has a huge amount of analysis targets. In addition, input information Cp from the time series data TD on the process target substrate Wp is entered into the trained model LM, whereby the trained model LM outputs the sublimation drying process condition informa- tion Rp indicating the sublimation drying process condition. This therefore enables performance of a sublimation drying process suitable for the process target substrate Wp.

Figure 2:
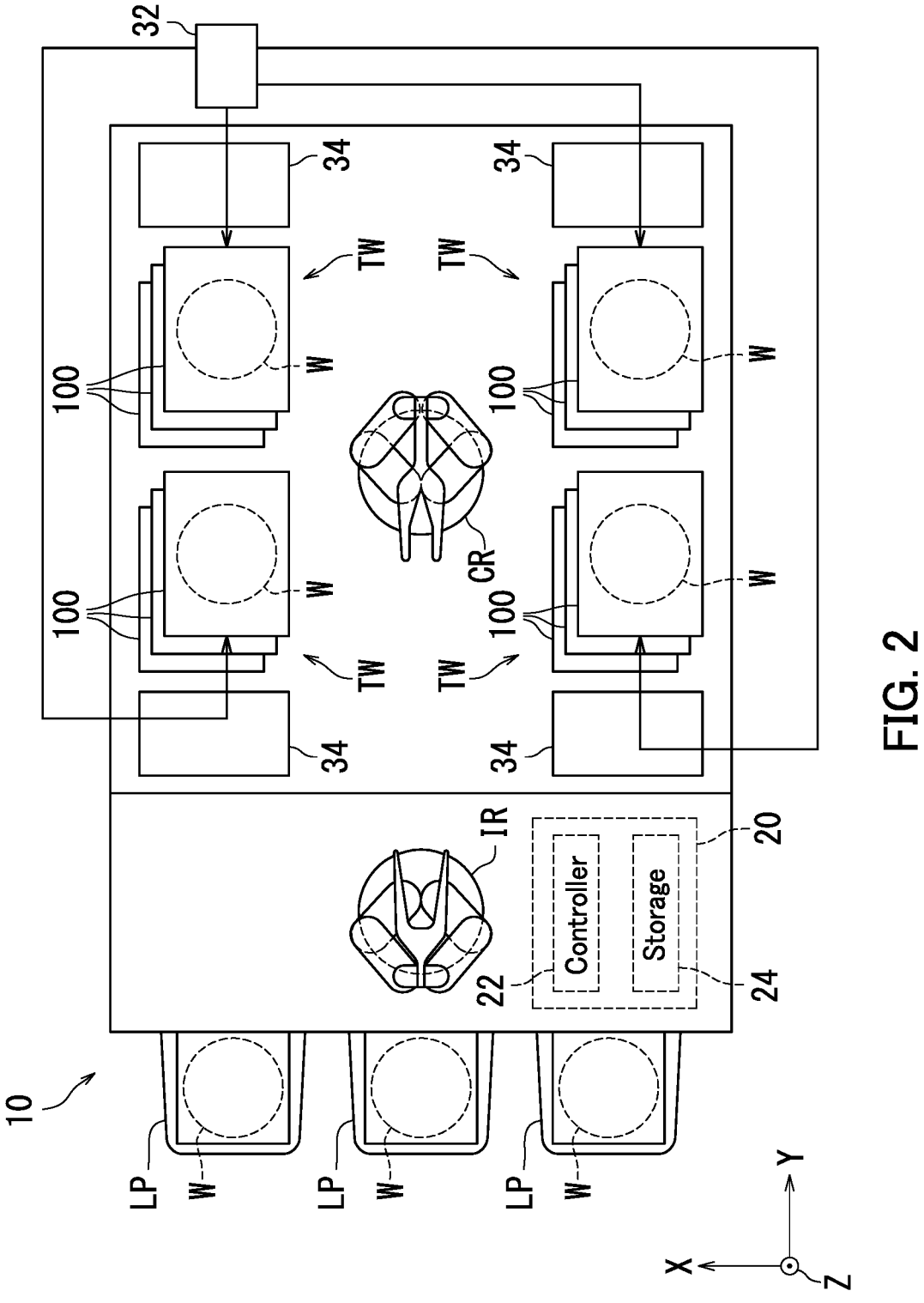
FIG. 2 is a schematic diagram of a substrate processing system provided with the substrate processing apparatus according to the present embodiment.

Next, a substrate processing system 10 including the substrate processing apparatus 100 according to the present embodiment will be described with reference to FIG. 2. FIG. 2 is a schematic plan view of the substrate processing system 10.

The substrate processing system 10 processes substrates W. The substrate processing system 10 includes a plurality of substrate processing apparatuses 100. Each substrate processing apparatus 100 processes a substrate W by per- forming at least one of things which include etching, surface treatment, characterization, processing film formation, removal of at least part of the film, and cleaning.

In addition to a plurality of substrate processing appara- tuses 100, the substrate processing system 10 includes a fluid cabinet 32, fluid boxes 34, a plurality of load ports LP, an indexer robot IR, a center robot CR, and a control device 20 as illustrated in FIG. 1. The control device 20 controls the load ports LP, the indexer robot IR, and the center robot CR.

Each of the load ports LP accommodates a plurality of substrates W in a stack. The indexer robot IR conveys the substrate W between the load ports LP and the center robot CR. Note that an apparatus configuration may be adopted in which the substrate W is indirectly transferred between the indexer robot IR and the center robot CR via an installation table (pass). Here, the installation table is used for tempo- rarily placing the substrate W between the indexer robot IR and the center robot CR. The center robot CR conveys the substrate W between the indexer robot IR and the substrate processing apparatuses 100. Each of the substrate processing apparatuses 100 ejects a liquid onto a substrate W to process the substrate W. The liquid contains a chemical liquid, a rinse liquid, a replacement liquid, and/or a processing liquid. Alternatively, the liquid may contain other liquids. The fluid cabinet 32 stores the liquid. Note that the fluid cabinet 32 may store gas.

Specifically, the substrate processing apparatuses 100 form a plurality of towers TW (four towers TW in FIG. 2) arranged to surround the center robot CR in plan view. Each tower TW includes a plurality of substrate processing appa- ratuses 100 (three substrate processing apparatuses 100 in FIG. 2) that are stacked vertically. Each of the fluid boxes 34 corresponds to a plurality of towers TW. The liquid in the fluid cabinet 32 is supplied, via any of the fluid boxes 34, to all the substrate processing apparatuses 100 included in the tower TW corresponding to the fluid box 34. The gas in the fluid cabinet 32 is also supplied, via any of the fluid boxes 34, to all the substrate processing apparatuses 100 included in the tower TW corresponding to the fluid box 34.

The control device 20 controls various operations per- formed by the substrate processing system 10. The control device 20 includes a controller 22 and storage 24. The controller 22 includes a processor. The controller 22 includes, for example a central processing unit (CPU). Alternatively, the controller 22 may include a general- purpose computing unit.

The storage 24 stores data and a computer program. The data contains recipe data. The recipe data contains informa- tion indicating a plurality of recipes. Each of the plurality of recipes defines content and procedure of a process on each substrate W.

The storage 24 includes a main storage device and an auxiliary storage device. The main storage device is, for example a semiconductor memory. The auxiliary storage device is, for example, semiconductor memory and/or a hard disk drive. The storage 24 may include removable media. The controller 22 executes the computer program stored in the storage 24 to perform a substrate processing operation.

The storage 24 stores a computer program including a predetermined procedure. The substrate processing appara- tus 100 operates according to the procedure defined in the computer program.

Although FIG. 2 illustrates that one control device 20 is provided for the substrate processing system 10, the control device 20 may be provided for each of the substrate pro- cessing apparatuses 100. However, in that case, the substrate processing system 10 preferably includes a plurality of substrate processing apparatuses 100 and another control device that controls apparatuses other than the substrate processing apparatuses 100.

Figure 3:
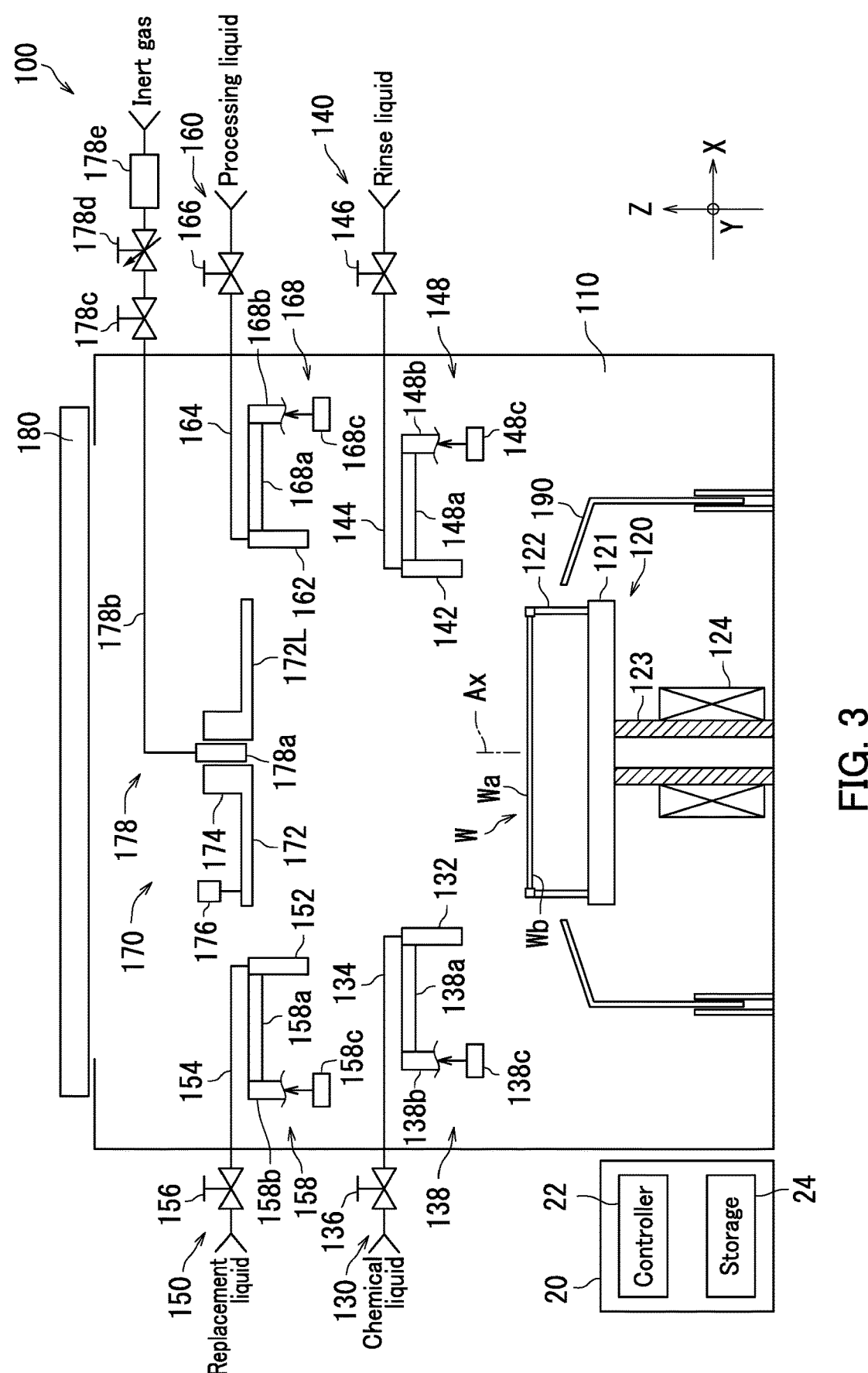
FIG. 3 is a schematic diagram of the substrate processing apparatus according to the present embodiment.

Next, a substrate processing apparatus 100 according to the present embodiment will be described with reference to FIG. 3. FIG. 3 is a schematic diagram of the substrate processing apparatus 100 according to the present embodi- ment. Although the configuration of the substrate processing apparatus 100 will be described here, the substrate process- ing apparatus 100L also has the same configuration as the substrate processing apparatus 100.

The substrate processing apparatus 100 processes sub- strates W. The substrate processing apparatus 100 includes a chamber 110, a substrate holder 120, a chemical liquid supply section 130, a rinse liquid supply section 140, a replacement liquid supply section 150, a processing liquid supply section 160, a shield member 170, and a fan filter unit (FFU) 180. The chamber 110 accommodates a substrate W. The substrate holder 120 holds the substrate W. The substrate holder 120 holds the substrate W with the substrate W allowed to rotate freely.

The chamber 110 is in the shape of a box with an internal space. The chamber 110 accommodates a substrate W. Here, the substrate processing apparatus 100 is of a single substrate type that processes substrates W one by one, and substrates W are accommodated in the chamber 110 one by one. A substrate W is accommodated in the chamber 110 to be processed in the chamber 110. The chamber 110 accommodates at least part of each of sections which include the substrate holder 120, the chemical liquid supply section 130, the rinse liquid supply section 140, the replacement liquid supply section 150, the processing liquid supply section 160, and the shield member 170. On the other hand, the FFU 180 is attached on the outer top surface of the chamber 110.

The substrate holder 120 holds a substrate W. The substrate holder 120 holds the substrate W horizontally with the upper and lower (back) surfaces Wa and Wb of the substrate W facing vertically upward and downward, respectively. The substrate holder 120 also rotates the substrate W while holding the substrate W.

For example, the substrate holder 120 may be of a clamping type that clamps the edge of the substrate W. Alternatively, the substrate holder 120 may have any mechanism for holding the substrate W from the back surface Wb side. For example, the substrate holder 120 may be of a vacuum type. In this case, the substrate holder 120 holds the substrate W horizontally while keeping its own upper surface adhered to the central portion of the back surface Wb of the substrate W. Here, the back surface Wb is the non-device forming surface. Alternatively, the substrate holder 120 may be of a combination type of a vacuum type and a clamping type in which a plurality of chuck pins are brought into contact with the peripheral edge surface of the substrate W.

For example, the substrate holder 120 includes a spin base 121, a chuck member 122, a shaft 123, and an electric motor 124. The spin base 121 is provided with the chuck member 122. The chuck member 122 chucks the substrate W. Typically, the spin base 121 is provided with a plurality of chuck members 122.

The shaft 123 is a hollow shaft. The shaft 123 extends vertically along a rotation axis Ax. The spin base 121 is coupled to the upper end of the shaft 123. The back surface Wb of the substrate W faces the spin base 121, and the substrate W is placed above the spin base 121.

The spin base 121 is in the shape of a disc and supports the substrate W horizontally. The shaft 123 extends downward from the central portion of spin base 121. The electric motor 124 gives rotational force to the shaft 123. The electric motor 124 rotates the shaft 123 in a rotation direction, thereby rotating the substrate W and the spin base 121 about the rotation axis Ax. Here, the rotation direction is counterclockwise.

The chemical liquid supply section 130 supplies a substrate W with a chemical liquid. The substrate W is accordingly processed with the chemical liquid.

For example, the chemical liquid contains hydrofluoric acid (hydrogen fluoride water: HF). Examples of the chemical liquid may also include sulfuric acid, acetic acid, nitric acid, hydrochloric acid, citric acid, buffered hydrogen fluoride (BHF), dilute hydrogen fluoride (DHF), ammonia water, dilute ammonia water, hydrogen peroxide water, organic alkali (e.g., tetramethylammonium hydroxide (TMAH), etc.), a surfactant, and a corrosion inhibitor. The chemical liquid may be a mixed liquid obtained by mixing the above liquids. Examples of the chemical liquid obtained by mixing the above liquids include sulfuric acid-hydrogen peroxide mixture (SPM), ammonium hydrogen-peroxide mixture (SC1), and hydrochloric acid hydrogen peroxide mixture (SC2).

The chemical liquid supply section 130 includes a nozzle 132, a pipe 134, and a valve 136. The nozzle 132 faces the upper surface Wa of the substrate W and ejects the chemical liquid toward the upper surface Wa of the substrate W. The pipe 134 is coupled to the nozzle 132. The nozzle 132 is provided at the tip of pipe 134. The pipe 134 is supplied with a chemical liquid from a supply source. The pipe 134 is provided with the valve 136. The valve 136 opens and closes a flow channel in the pipe 134.

The chemical liquid supply section 130 further includes a nozzle moving section 138. The nozzle moving section 138 moves the nozzle 132 between an ejecting position and a retracted position. The nozzle 132 is located above the substrate W when the nozzle 132 is in the ejecting position. The nozzle 132 ejects the chemical liquid toward the upper surface Wa of the substrate W when the nozzle 132 is in the ejecting position. The nozzle 132 is located outside the substrate W in a radial direction of the substrate W when the nozzle 132 is in the retracted position.

The nozzle moving section 138 includes an arm 138a, a rotating shaft 138b, and a moving mechanism 138c. The arm 138a extends in an almost horizontal direction. The nozzle 132 is attached to the tip of the arm 138a. The arm 138a is coupled to the rotating shaft 138b. The rotating shaft 138b extends in an almost vertical direction. The moving mechanism 138c rotates the arm 138a in an almost horizontal plane while rotating the rotating shaft 138b around a rotating shaft line in an almost vertical direction. Thus, the nozzle 132 moves in an almost horizontal plane. For example, the moving mechanism 138c includes an arm swing motor that rotates the rotating shaft 138b around the rotating shaft line. The arm swing motor is, for example a servomotor. Further, the moving mechanism 138c raises and lowers the rotating shaft 138b in an almost vertical direction, thereby raising and lowering the arm 138. Thus, the nozzle 132 moves in an almost vertical direction. For example, the moving mechanism 138c includes a ball screw mechanism and an arm elevating motor that applies driving force to the ball screw mechanism. The arm elevating motor is, for example a servomotor.

The rinse liquid supply section 140 supplies a substrate W with a rinse liquid. Examples of the rinse liquid include deionized water (DIW), carbonated water, electrolysis ionized water, ozone water, ammonia water, diluted hydrochloric acid water (for example, about 10 ppm to 100 ppm), and reduced water (hydrogen water).

The rinse liquid supply section 140 includes a nozzle 142, a pipe 144, and a valve 146. The nozzle 142 faces the upper surface Wa of the substrate W and ejects a rinse liquid toward the upper surface Wa of the substrate W. The nozzle 142 is coupled to the pipe 144. The nozzle 142 is provided at the tip of pipe 144. The pipe 144 is supplied with a rinse liquid from a supply source. The pipe 144 is provided with the valve 146. The valve 146 opens and closes a flow channel in the pipe 144.

The rinse liquid supply section 140 further includes a nozzle moving section 148. The nozzle moving section 148 moves the nozzle 142 between an ejecting position and a retracted position. The nozzle 142 is positioned above the substrate W when the nozzle 142 is in the ejecting position. The nozzle 142 ejects a rinse liquid toward the upper surface Wa of the substrate W when the nozzle 142 is in the ejecting position. The nozzle 142 is located outside the substrate W in a radial direction of the substrate W when the nozzle 142 is in the retracted position.

The nozzle moving section 148 includes an arm 148a, a rotating shaft 148b, and a moving mechanism 148c. For example, the configuration of the nozzle moving section 148 is the same as the configuration of the nozzle moving section 138.

The replacement liquid supply section 150 supplies a substrate W with a replacement liquid. As will be described later, the replacement liquid is supplied to the upper surface of the substrate W, covered with the liquid film of the rinse liquid, and then a processing liquid is supplied to the upper surface of the substrate W, covered with the liquid film of the replacement liquid. The replacement liquid is a liquid that is soluble with both the rinse liquid and the processing liquid.

Examples of the replacement liquid include isopropyl alcohol (IPA) and hydrofluoroether (HFE). The replacement liquid may be a mixed liquid of IPA and HFE, or may contain at least one of both IPA and HFE as well as other components. IPA and HFE are liquids that are soluble with both water and hydrocarbon fluoride compounds.

The replacement liquid supply section 150 includes a nozzle 152, a pipe 154, and a valve 156. The nozzle 152 faces the upper surface Wa of the substrate W and ejects the replacement liquid toward the upper surface Wa of the substrate W. The nozzle 152 is coupled to the pipe 154. The nozzle 152 is provided at the tip of pipe 154. The pipe 154 is supplied with a replacement liquid from a supply source. The pipe 154 is provided with the valve 156. The valve 156 opens and closes a flow channel in the pipe 154.

The replacement liquid supply section 150 further includes a nozzle moving section 158. The nozzle moving section 158 moves the nozzle 152 between an ejecting position and a retracted position. The nozzle 152 is located above the substrate W when the nozzle 152 is in the ejecting position. The nozzle 152 ejects the replacement liquid toward the upper surface Wa of the substrate W when the nozzle 152 is in the ejecting position. The nozzle 152 is located outside the substrate Win a radial direction of the substrate W when the nozzle 152 is in the retracted position.

The nozzle moving section 158 includes an arm 158a, a rotating shaft 158b, and a moving mechanism 158c. For example, the configuration of the nozzle moving section 158 is the same as the configuration of the nozzle moving section 138.

The processing liquid supply section 160 supplies a substrate W with a processing liquid. The processing liquid is a solution containing a solvent and a substance to sublime. The substance to sublime corresponds to a solute. The solvent dissolves with the substance to sublime. The substance to sublime may be a substance that changes from a solid to a gas at normal temperature (synonymous with room temperature) or normal pressure (pressure in the substrate processing apparatus 100, for example 1 atm or a value in the vicinity thereof) without going through a liquid state. The solvent may be such a substance, or may be a substance other than this. That is, the processing liquid may contain two or more substances that change from a solid to a gas at normal temperature or normal pressure without going through a liquid state.

Examples of the substance that sublimes may include alcohols such as 2-methyl-2-propanol (alias: tert-butyl alcohol, t-butyl alcohol, tertiary butyl alcohol) and cyclohexanol, as well as hydrocarbon fluoride compounds, 1,3,5-trioxane (alias: meth formaldehyde), camphor, naphthalene, iodine, cyclohexane, cyclohexanone oxime, and substances other than these.

The solvent may be, for example at least one selected from the group consisting of pure water, IPA, hydrofluoroether (HFE), acetone, propylene glycol monomethyl ether acetate (PGMEA), propylene glycol monoethyl ether, 1-ethoxy-2-propanol (PGEE), ethylene glycol, and hydrofluorocarbon.

In a preferable example, the substance that sublimes is cyclohexanone oxime and the solvent is IPA. In this case, at room temperature (at or near 23° C.), the vapor pressure of IPA is higher than that of cyclohexanone oxime at room temperature. Cyclohexanone oxime has a freezing point of 90.5° C. and a boiling point of 210° C., and IPA has a freezing point of −90° C. and a boiling point of 83° C. Here, the substrate processing apparatus 100 is placed in a clean room maintained at room temperature, and the processing liquid can maintain a liquid state in which the substance that sublimes is dissolved in the solvent.

The processing liquid supply section 160 includes a nozzle 162, a pipe 164, and a valve 166. The nozzle 162 faces the upper surface Wa of the substrate W and ejects the processing liquid toward the upper surface Wa of the substrate W. The nozzle 162 is coupled to the pipe 164. The nozzle 162 is provided at the tip of the pipe 164. The pipe 164 is supplied with a processing liquid from a supply source. The pipe 164 is provided with the valve 166. The valve 166 opens and closes a flow channel in the pipe 164.

The processing liquid supply section 160 further includes a nozzle moving section 168. The nozzle moving section 168 moves the nozzle 162 between an ejecting position and a retracted position. The nozzle 162 is positioned above the substrate W when the nozzle 162 is in the ejecting position. The nozzle 162 ejects the processing liquid toward the upper surface Wa of the substrate W when the nozzle 162 is in the ejecting position. The nozzle 162 is located outside the substrate Win a radial direction of the nozzle 162 when the nozzle 162 is in the retracted position.

The nozzle moving section 168 includes an arm 168a, a rotating shaft 168b, and a moving mechanism 168c. For example, the configuration of the nozzle moving section 168 is the same as the configuration of the nozzle moving section 138.

The shield member 170 includes a shield plate 172, a support shaft 174, an elevating unit 176, and an inert gas supply section 178. The shield plate 172 is placed horizontally above the substrate holder 120. The shield plate 172 includes a thin circular plate. The shield plate 172 is horizontally supported by the support shaft 174 that is in the shape of a cylinder and extends upward from the central portion of the shield plate 172. The centerline of the shield plate 172 is positioned on the rotation axis Ax of the substrate W.

A lower surface 172L of the shield plate 172 faces the upper surface of the substrate W. The lower surface 172L of the shield plate 172 is parallel to the upper surface Wa of the substrate W and has an outer diameter equal to or larger than the diameter of the substrate W.

The elevating unit 176 elevates the shield plate 172 in the vertical direction. The elevating unit 176 moves the shield plate 172 to any position from an upper position to a lower position. In FIG. 3, the shield plate 172 is located in the upper position. The upper position is a position where the shield plate 172 is retracted to a height allowing the nozzles 132, 142, 152, and 162 to enter a space between the shield member 170 and the substrate W. The lower position is a position where the lower surface 172L of the shield plate 172 is close to the upper surface Wa of the substrate W to a height prohibiting the nozzles 132, 142, 152, and 162 from entering the space between the substrate W and the shield member 170.

The inert gas supply section 178 supplies a substrate W with an inert gas. Examples of the inert gas include helium gas, argon gas, and nitrogen gas. The examples may further include gases other than helium gas, argon gas, and nitrogen gas.

The inert gas supply section 178 includes a nozzle 178a, a pipe 178b, a valve 178c, a flow rate control valve 178d, and a temperature regulator 178e. The nozzle 178a faces the upper surface Wa of the substrate W and ejects an inert gas toward the upper surface Wa of the substrate W. The nozzle 178a is coupled to the pipe 178b. The nozzle 178a is provided at the tip of the pipe 178b. The pipe 178b is supplied with an inert gas from a supply source.

The pipe 178b is provided with the valve 178c, the flow rate control valve 178d, and the temperature regulator 178e. The valve 178c opens and closes a flow channel in the pipe 178b. The flow rate control valve 178d adjusts the flow rate of an inert gas passing through the flow channel in the pipe 178b. The temperature regulator 178e regulates the temperature of the inert gas. For example, the temperature regulator 178e heats or cools the inert gas.

The nozzle 178a ejects an inert gas downward through a central opening, of the shield plate 172, which opens at the center of the lower surface 172L. The nozzle 178a extends vertically along the rotation axis Ax. The nozzle 178a is placed in a through-hole vertically penetrating the central portion of both the shield plate 172 and the support shaft 174. The nozzle 178a is allowed to move up and down together with the shield plate 172. The outlet of the nozzle 178a is placed above the central opening of the shield plate 172.

The pipe 178b guides an inert gas to the nozzle 178a. When the valve 178c is opened, the inert gas is continuously ejected downward from the outlet of the nozzle 178a at a flow rate corresponding to the degree of opening of the flow control valve 178d. The inert gas to be ejected from the nozzle 178a is nitrogen gas, for example.

The FFU 180 is placed on the outside of the top of chamber 110. The chamber 110 is provided, in an upper portion thereof, with a vent which allows the FFU 180 to send air into the chamber 110 through.

The substrate processing apparatus 100 further includes a cup 190. The cup 190 collects the liquid scattered from the substrate W. The cup 190 is allows to move vertically upward to the side of the substrate W. The cup 190 may also move vertically downward from the side of the substrate W.

The control device 20 controls various operations performed by the substrate processing apparatus 100. The controller 22 controls the substrate holder 120, the chemical liquid supply section 130, the rinse liquid supply section 140, the replacement liquid supply section 150, the processing liquid supply section 160, the shield member 170, the FFU 180, and/or the cup 190. In an example, the controller 22 controls the electric motor 124, the valves 136, 146, 156, 166, and 178c, the flow rate control valve 178d, the moving mechanisms 138c, 148c, 158c, and 168c, the elevating unit 176, the FFU 180, and/or the cup 190.

The substrate processing apparatus 100 according to the present embodiment performs, on the substrates W, a chemical liquid process, a rinse process, a replacement process, and a sublimation drying process. Although not illustrated in FIG. 3 to avoid the drawings being overly complicated, sensors and the like preferably detects respective flow rates and temperatures of a chemical liquid, a rinse liquid, a replacement liquid, a processing liquid, and an inert gas.

Next, a substrate processing apparatus 100 according to the present embodiment will be described with reference to FIGS. 1 to 4. FIG. 4 is a block diagram of the substrate processing system 10 including the substrate processing apparatus 100.

As illustrated in FIG. 4, the control device 20 controls various operations performed by the substrate processing system 10. The control device 20 controls the indexer robot IR, the center robot CR, the substrate holder 120, the chemical liquid supply section 130, the rinse liquid supply section 140, the replacement liquid supply section 150, the processing liquid supply section 160, the shield member 170, the FFU 180, and the cup 190. Specifically, the control device 20 controls the indexer robot IR, the center robot CR, the substrate holder 120, the chemical liquid supply section 130, the rinse liquid supply section 140, the replacement liquid supply section 150, the processing liquid supply section 160, the shield member 170, the FFU 180, and the cup 190 by transmitting their respective control signals.

Specifically, the controller 22 controls the indexer robot IR to transfer substrates W through the indexer robot IR.

The controller 22 controls the center robot CR to transfer substrates W through the center robot CR. For example, the center robot CR receives a substrate W to be processed and loads the substrate W into any of a plurality of chambers 110. The center robot CR also receives the substrate W, which has been processed, from a chamber 110 to unload the substrate W.

The controller 22 controls a substrate holder 120 to control the start of rotation of a substrate W, the change of the rotation speed, and the stop of the rotation of the substrate W. For example, the controller 22 can change the number of rotations of the substrate holder 120 through control of the substrate holder 120. Specifically, the controller 22 can change the number of rotations of the substrate W by changing the rotation speed of the electric motor 124 in the substrate holder 120.

The controller 22 can switch respective states of the valves 136, 146, 156, 166, and 178c between open and closed states by controlling the valve 136 of the chemical liquid supply section 130, the valve 146 of the rinse liquid supply section 140, the valve 156 of the replacement liquid supply section 150, the valve 166 of the processing liquid supply section 160, and the valve 178c of the inert gas supply section 178. Specifically, the controller 22 controls the valves 136, 146, 156, 166, and 178c to open the valves 136, 146, 156, 166, and 178c. This enables the chemical liquid, the rinse liquid, the replacement liquid, the processing liquid, and the inert gas flowing in the pipes 134, 144, 154, 164, and 178b to pass therethrough toward the nozzles 132, 142, 152, 162, and 178a, respectively. The controller 22 also controls the valve 136 of the chemical liquid supply section 130, the valve 146 of the rinse liquid supply section 140, the valve 156 of the replacement liquid supply section 150, the valve 166 of the processing liquid supply section 160, and the valve 178c of the inert gas supply section 178 to close the valves 136, 146, 156, 166, and 178c. This disables the chemical liquid, the rinse liquid, the replacement liquid, the processing liquid, and the inert gas flowing in the pipes 134, 144, 154, 164, and 178b from passing therethrough toward the nozzles 132, 142, 152, 162, and 178a, respectively.

The controller 22 also controls the moving mechanisms 138*c*, 148*c*, 158*c*, and 168*c* to move their respective arms 138*a*, 148*a*, 158*a*, and 168*a* horizontally and/or vertically. This control by the controller 22 enables the nozzles 132, 142, 152, and 162 attached to respective tips of the arms 138*a*, 148*a*, 158*a*, and 168*a* to move on the upper surface Wa of a substrate W. The control by the controller 22 enables the nozzles 132, 142, 152, and 162 attached to the respective tips of the arms 138*a*, 148*a*, 158*a*, and 168*a* to move between their respective ejecting and retracted positions.

The controller 22 also controls a shield member 170 to move the shield plate 172 between the upper position and the lower position. For example, the controller 22 drives the elevating unit 176 to move the shield plate 172 between the upper position and the lower position.

The controller 22 controls the FFU 180 to send air into the chamber from the vent above the chamber 110. The controller 22 also controls a cup 190 to elevate the cup 190 to the side of the substrate W.

The substrate processing apparatus 100 according to the present embodiment is suitably used to form semiconductor devices. The substrate processing apparatus 100 is preferably used to manufacture NAND structure memory, for example. The substrate processing apparatus 100 may be used for manufacturing 3D NAND structures.

In the substrate processing apparatus 100 according to the present embodiment, the storage 24 stores the trained model LM and a control program PG The substrate processing apparatus 100 operates according to the procedure defined in the control program PG.

The controller 22 includes an input information acquiring section 22*a* and a sublimation drying process condition information acquiring section 22*b*. The input information acquiring section 22*a* acquires, as the input information, at least one of both substrate information and processing liquid information.

The input information acquiring section 22*a* includes a substrate information acquiring section 22*a*1 and a processing liquid information acquiring section 22*a*2. The substrate information acquiring section 22*a*1 acquires substrate information on a process target substrate Wp. The substrate information on the process target substrate Wp includes substrate attribute information or pattern forming condition information. The substrate attribute information indicates an attribute of grooves and structures provided in the process target substrate Wp. The pattern forming condition information indicates a forming condition of a pattern of grooves and structures formed in the process target substrate Wp. Note that the substrate information on the process target substrate Wp may include both the substrate attribute information and the pattern forming condition information.

The substrate attribute information indicates an attribute of at least one of both the grooves and the structures, for example. In an example, the substrate information includes surface area of substrate, depth of grooves, width of grooves, aspect ratio of grooves, arrangement pattern of grooves and structures, intensity of grooves, density of grooves or structures, opening ratio of grooves, and surface composition of structures. Note that the surface area of substrate is preferably measured in consideration of the depth of grooves and the opening ratio of grooves with respect to the structures. The surface area of substrate however need not be measured directly. As the surface area of substrate, the perimeter of the substrate that can be easily calculated (circumference length for circular substrate, four-sides-length for square substrate) may be used. The density of grooves may be indicated by the ratio of area of grooves to surface region area of substrate, for example. The density of structures may be indicated by the ratio, to the surface region area of substrate, of the surface area of the structures including portions exposed through grooves.

The pattern forming condition information indicates a forming condition for forming a pattern of grooves and structures. For example, when grooves are formed in a process target substrate Wp by etching, the pattern forming condition information indicates a corresponding etching process condition.

Alternatively, if an attribute of at least one of both the grooves and structures in a process target substrate Wp varies according to a process in the substrate processing apparatus 100, the pattern forming condition information may indicate the process condition. For example, when an attribute of at least one of both grooves and structures in a process target substrate Wp varies according to a chemical liquid, the pattern forming condition information indicates a corresponding chemical liquid process condition. In one example, the pattern forming condition information is information on the chemical liquid and indicates type, concentration, temperature, and supply amount. Note that the pattern forming condition information may indicate a process condition other than the chemical liquid process condition. The substrate information acquiring section 22*a*1 may acquire information other than the substrate attribute information and the pattern forming condition information from the storage 24 as the substrate information.

The processing liquid information acquiring section 22*a*2 acquires the processing liquid information indicating an attribute of a processing liquid supplied to a process target substrate Wp. That is, the processing liquid information acquiring section 22*a*2 acquires the processing liquid information indicating an attribute of a processing liquid supplied from the processing liquid supply section 160 to a process target substrate Wp. For example, the processing liquid information includes information indicating type of solute, type of solvent, and concentration or temperature of processing liquid. Note that the temperature of a processing liquid is preferably the temperature of a processing liquid supplied onto a process target substrate Wp. However, the temperature of the processing liquid may be the temperature of the processing liquid passing through the pipe 164.

The trained model LM generates sublimation drying process condition information based on at least one of both the substrate information and the processing liquid information. Typically, when the substrate information and the processing liquid information are entered in the trained model LM, sublimation drying process condition information is output according to the substrate information and the processing liquid information. In an example, when information indicating depth of grooves in a process target substrate Wp and the concentration of a processing liquid used for the process target substrate Wp are entered in the trained model LM, sublimation drying process condition information is output from the trained model LM according to the input information.

The sublimation drying process condition information acquiring section 22*b* acquires sublimation drying process condition information from the trained model LM. The sublimation drying process condition information acquiring section 22*b* acquires, from the trained model LM, sublimation drying process condition information corresponding to input information on a process target substrate Wp.

For example, the sublimation drying process condition information indicates any of supply amount of processing liquid, ejecting pattern of processing liquid, and rotation speed of learning target substrate WL in sublimation drying process. The sublimation drying process condition information may indicate any of the temperature inside the chamber 110 (or of the substrate W (particularly, the upper surface Wa)), the atmospheric concentration inside the chamber 110, the position of the shield member 170, and the flow rate of the inert gas to be supplied from the inert gas supply section 178. Note that the degree of evaporation of the solvent greatly varies according to the temperature inside the chamber 110 and the atmospheric concentration of the solvent. The temporal change in the temperature inside the chamber 110 or the atmospheric concentration of the solvent greatly affect the pattern collapse during evaporation of the solvent in particular. The temperature inside the chamber 110 and the atmospheric concentration of the solvent therefore provide useful information.

The controller 22 controls the substrate holder 120 and the processing liquid supply section 160 according to the sublimation drying process condition indicated by the sublimation drying process condition information. Note that the controller 22 may control the shield member 170 together with the substrate holder 120 and the processing liquid supply section 160 according to the sublimation drying process condition.

Preferably, the substrate processing system 10 further includes a display section 42, an input section 44, and a communication section 46.

The display section 42 displays images. Examples of the display section 42 include a liquid crystal display and an organic electroluminescent display.

The input section 44 is an input device that allows various information to be entered in the controller 22. Examples of the input section 44 include a keyboard, a pointing device, and a touch panel.

The communication section 46 is connected to a network and communicates with external devices. In the present embodiment, examples of the network include the Internet, a local area network (LAN), a public telephone network, and a short-range wireless network. The communication section 46 is a communication device, such as a network interface controller.

Preferably, the substrate processing system 10 further includes a sensor 50. A plurality of sensors 50 typically sense respective states of portions of the substrate processing system 10. For example, at least some of the sensors 50 sense respective states of portions of the substrate processing apparatus 100.

The storage 24 stores time series data TD such as respective output results from the sensors 50 and control parameters according to the control program. Typically, the time series data is stored separately for each substrate W.

For each process of one substrate W, a sensor 50 detects a physical quantity of an object used by the substrate processing apparatus 100 in a period from the start of a process to the end of a process of the substrate W and transmits detection signals indicating the physical quantity to the controller 22. Time series data TD is then stored in the storage 24 through the controller 22 for each process of one substrate W with respective physical quantities indicated by the detection signals transmitted from the sensor 50 in the period from the start of the process to the end of the process of the substrate W being associated with time.

The controller 22 acquires the time series data TD from the sensor 50 and stores the time series data TD in the storage 24. In this case, the controller 22 stores the time series data TD in the storage 24 with the time series data TD associated with lot identification information, substrate identification information, process order information, and lot interval information. The lot identification information is information (for example, lot number) assigned to a particular lot. The lot indicates a unit of same process for substrates W. A predetermined number of substrates W constitute one lot. The substrate identification information is information for identifying the substrate W. The process order information is information indicating the process order for a predetermined number of substrates W constituting one lot. The lot interval information is information indicating the time interval from the end of a process for a lot to the start of a process for the next lot. The substrate information and the processing liquid information may be acquired from the time series data TD.

Figures 5A, 5B:
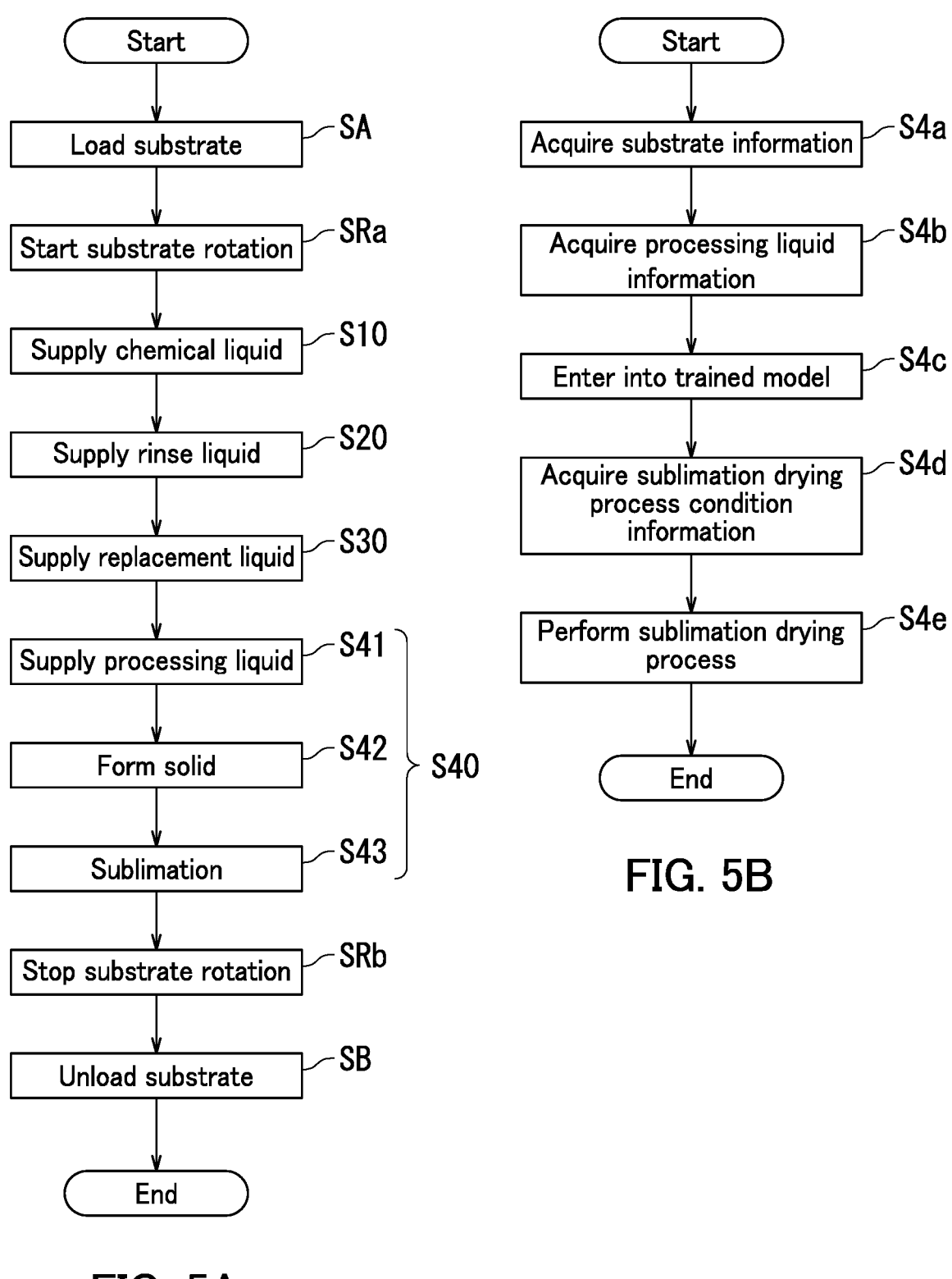
FIG. 5A is a flowchart of a substrate processing method according to the present embodiment.
FIG. 5B is a flowchart of a sublimation drying process in the substrate processing method according to the present embodiment.

Next, a substrate processing method by the substrate processing apparatus 100 according to the present embodiment will be described with reference to FIGS. 1 to 5. FIG. 5A is a flowchart of the substrate processing method in the substrate processing apparatus 100 according to the present embodiment. FIG. 5B is a flowchart of a sublimation drying process in the substrate processing method according to the present embodiment.

In Step SA, a process target substrate Wp is loaded into the substrate processing apparatus 100 as illustrated in FIG. 5A. The loaded process target substrate Wp is held by the substrate holder 120. Typically, the process target substrate Wp is loaded into the substrate processing apparatus 100 through the center robot CR.

Next, in Step SRa, the substrate holder 120 starts rotating while holding the process target substrate Wp.

In Step S10, the process target substrate Wp is processed with a chemical liquid. The chemical liquid supply section 130 supplies the chemical liquid to the process target substrate Wp. The chemical liquid is ejected from the nozzle 132 of the chemical liquid supply section 130 onto the upper surface Wa of the process target substrate Wp. The chemical liquid covers the upper surface Wa of the process target substrate Wp. Thus, the process target substrate Wp is processed with the chemical liquid.

In Step S20, the process target substrate Wp is rinsed with a rinse liquid. The rinse liquid supply section 140 supplies the rinse liquid to the process target substrate Wp. The rinse liquid is ejected from the nozzle 142 of the rinse liquid supply section 140 onto the upper surface Wa of the process target substrate Wp. The rinse liquid covers the upper surface Wa of the process target substrate Wp. Thus, the process target substrate Wp is processed with the rinse liquid.

In Step S30, the process target substrate Wp is replaced with a replacement liquid. The replacement liquid supply section 150 supplies the replacement liquid to the process target substrate Wp. The replacement liquid is ejected from the nozzle 152 of the replacement liquid supply section 150 onto the upper surface Wa of the process target substrate Wp. The replacement liquid covers the upper surface Wa of the process target substrate Wp. Thus, the liquid on the upper surface Wa of the process target substrate Wp is replaced with the replacement liquid.

In step S40, a sublimation drying process is then performed on the process target substrate Wp. The sublimation drying process includes processing liquid supply (Step S41), solid formation (Step S42), and sublimation (Step S43).

In Step S41, a processing liquid is supplied to the process target substrate Wp. The processing liquid supply section 160 supplies the processing liquid to the process target substrate Wp. The processing liquid is ejected from the nozzle 162 of the processing liquid supply section 160 onto the upper surface Wa of the process target substrate Wp. The processing liquid covers the upper surface Wa of the process target substrate Wp. Thus, the liquid on the upper surface Wa of the process target substrate Wp is replaced with the processing liquid.

Specifically, after starting supplying the processing liquid to the process target substrate Wp, the rotation speed of the substrate holder 120 is maintained at a predetermined speed. A predetermined thickness of the processing liquid is formed on the upper surface Wa of the process target substrate Wp.

In Step S42, a solid is formed from the processing liquid. The substrate holder 120 continues to rotate the substrate W while holding the processing liquid on the upper surface Wa of the substrate W, and then the solvent evaporates from the processing liquid. When the solvent evaporates, a substance to sublime, which was the solute, is solidified to form a solid. The grooves in the upper surface Wa of the substrate W are therefore filled with their respective solids. The thickness of solids corresponds to the thickness of the processing liquid formed on the upper surface Wa of the process target substrate Wp before the solids are formed. Note that the inert gas supply section 178 of the shield member 170 may supply an inert gas to the substrate W when the solids are formed.

In Step S43, the solids sublime. When the substrate holder 120 continues to rotate the substrate W while holding the solids on the upper surface Wa of the substrate W, the solids continues to sublime, and eventually disappears from the grooves in the upper surface Wa of the substrate W. Note that the inert gas supply section 178 of the shield member 170 may supply an inert gas to the substrate W when the solids sublime. In addition, the substrate W may be heated when the solids sublime.

The substrate holder 120 then stops rotating the substrate in Step SRb.

In Step SB, the process target substrate Wp is removed from the substrate holder 120 and unloaded. Typically, the process target substrate Wp is unloaded from the substrate processing apparatus 100 through the center robot CR. As described above, the process target substrate Wp can be dried while the process target substrate Wp is processed with the chemical liquid and the structures are prevented from collapsing.

Next, a sublimation drying process for the process target substrate Wp by the substrate processing apparatus 100 according to the present embodiment will be described with reference to FIGS. 1 to 5B.

In Step S4a, the substrate information on the process target substrate Wp is acquired. The substrate information acquiring section 22a1 acquires the substrate information on the process target substrate Wp. The substrate information includes at least one of both substrate attribute information and pattern forming condition information.

For example, the controller 22 acquires the substrate attribute information from the storage 24. The substrate attribute information indicates at least one of both attributes of grooves and structures. For example, the substrate attribute information indicates the depth of grooves. Alternatively, the substrate attribute information may indicate the width of grooves or the aspect ratio (depth/width) of grooves. The substrate attribute information may further indicate the arrangement pattern of grooves and structures, the density of grooves, the intensity of grooves or structures, and the opening ratio of grooves.

The substrate attribute information may be information indicating the composition of structures or the affinity for water. For example, the information indicating the composition of structures indicates that the composition of structures is silicon oxide or silicon nitride. The information on the structures indicating the affinity for water also indicates that the structures are hydrophilic or hydrophobic.

The substrate attribute information may be measured within the substrate processing apparatus 100 or the substrate processing system 10. Alternatively, the substrate attribute information may be measured outside the substrate processing system 10 or the substrate processing apparatus 100.

Alternatively, the controller 22 acquires the pattern forming condition information from the storage 24. The pattern forming condition information indicates a forming condition for forming the structures and grooves. When the grooves of the substrate W are formed by etching, the controller 22 acquires the etching condition information from the storage 24. Alternatively, the pattern forming condition information indicates a process condition for changing respective attributes of the structures and grooves. For example, when the depth or width of structures and grooves is changed by a chemical liquid, the pattern forming condition information is information on the chemical liquid and indicates concentration, temperature and supply amount.

In Step S4b, the processing liquid information of the process target substrate Wp is acquired. The processing liquid information acquiring section 22a2 acquires the processing liquid information on the process target substrate Wp. The processing liquid information indicates any of a concentration and temperature of a processing liquid used for a sublimation drying process performed on the process target substrate Wp, and respective types of a solvent and a substance to sublime, contained in the processing liquid.

In Step S4c, the processing liquid information and the substrate information on the process target substrate Wp are entered in the trained model LM. Although details will be described later, the trained model LM is constituted from training data. The training data includes substrate information on a learning target substrate WL, processing liquid information indicating an attribute of the processing liquid used for the learning target substrate WL, sublimation drying process condition information indicating a sublimation drying process condition performed on the learning target substrate WL, and process result information indicating a result of a sublimation drying process performed on the learning target substrate WL. The trained model LM outputs the sublimation drying process condition information Rp corresponding to the processing liquid information and the substrate information on the process target substrate Wp.

In Step S4d, sublimation drying process condition information is acquired from the trained model LM. The sublimation drying process condition information acquiring section 22b acquires sublimation drying process condition information corresponding to the processing liquid information and the substrate information from the trained model LM.

In Step S4e, the substrate holder 120 and the chemical liquid supply section 130 perform a sublimation drying process on the process target substrate Wp according to the sublimation drying process condition information. In the substrate processing apparatus 100 illustrated in FIG. 3, the processing liquid supply section 160 supplies a processing liquid to the process target substrate Wp according to the sublimation drying process condition information (Step S41 in FIG. 5A). Solids are then formed from the processing liquid (Step S42 in FIG. 5A), and the solids sublime (step S43 in FIG. 5A). The shield member 170 may be controlled when the sublimation drying process is performed. As described above, the sublimation drying process can be performed on the process target substrate Wp.

In the present embodiment, sublimation drying process condition information corresponding to the processing liquid information and the substrate information on the process target substrate Wp is acquired from the trained model LM constructed by machine learning. The sublimation drying process is then performed according to the sublimation drying process condition indicated in the sublimation drying process condition information. The present embodiment enables an appropriate performance of the sublimation drying process according to the pattern of structures and grooves in the process target substrate Wp.

In the above description with reference to FIG. 5B, the substrate information is acquired in Step S4*a* while the processing liquid information is acquired in Step S4*b*. The substrate information and the processing liquid information are then entered in the trained model LM as input information. However, the present embodiment is not limited to this. Either one of the substrate information and the processing liquid information may be entered in the trained model LM as the input information. Even in this case, the sublimation drying process condition information corresponding to the input information is acquired from the trained model LM, and the sublimation drying process can be performed according to the sublimation drying process condition.

Next, a substrate processing method according to the present embodiment will be described with reference to FIGS. 6A to 7C. FIGS. 6A to 6E and 7A to 7C schematically illustrate a process on a process target substrate Wp in the substrate processing method according to the present embodiment.

Figure 6A:
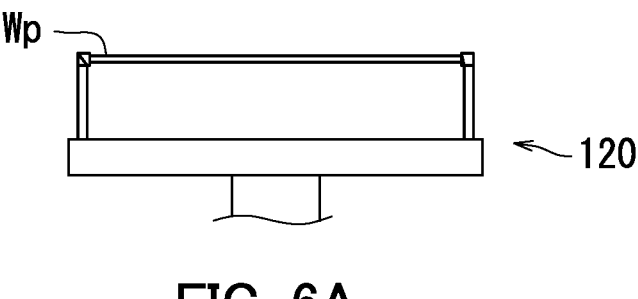
FIGS. 6A to 6E schematically illustrate a substrate processing method in the substrate processing apparatus according to the present embodiment.

As illustrated in FIG. 6A, the process target substrate Wp is loaded into the substrate holder 120. FIG. 6A corresponds to Step SA in FIG. 5A.

Figure 6B:
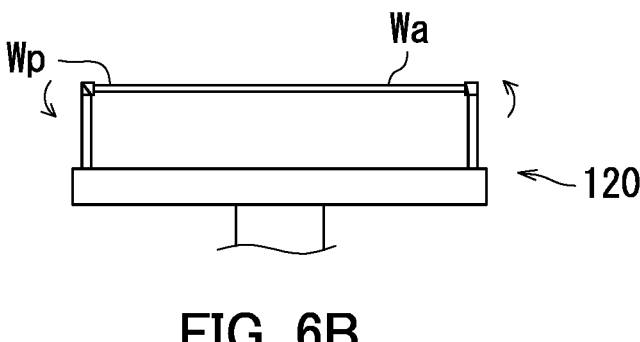

As illustrated in FIG. 6B, the rotation of the process target substrate Wp is started. The substrate holder 120 starts rotating together with the loaded process target substrate Wp. FIG. 6B corresponds to Step SRa in FIG. 5A.

Figure 6C:
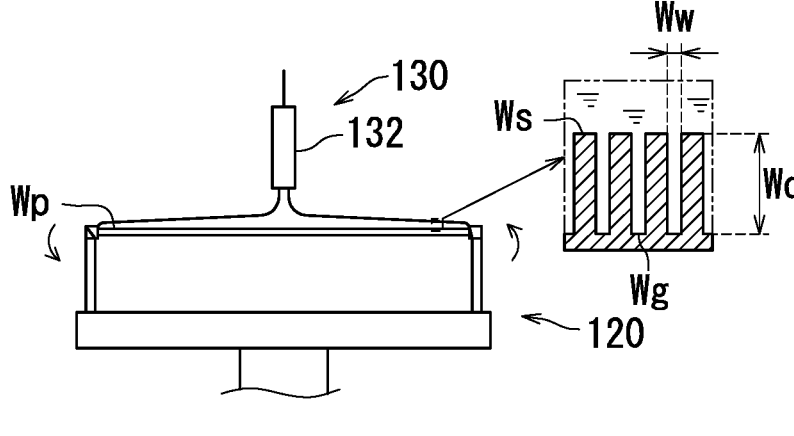

As illustrated in FIG. 6C, the process target substrate Wp is supplied with a chemical liquid. The chemical liquid supply section 130 supplies the process target substrate Wp with the chemical liquid. FIG. 6C corresponds to Step S10 in FIG. 5A.

Note that FIG. 6C illustrates an enlarged pattern of grooves Wg and structures Ws in a region of the process target substrate Wp. The grooves Wg and structures Ws are formed in the process target substrate Wp. Here, the grooves Wg are formed at regular intervals, thereby forming the structures Ws. Typically, the grooves in the process target substrate Wp are formed through a dry etching device separate from the substrate processing apparatus 100.

The depth of grooves Wg is Wd, and the width of grooves Wg is Ww. For example, the depth Wd of grooves Wg is 50 nm or more and 1000 nm or less, and may also be 10 nm or more and 800 nm or less. The width Ww of grooves Wg is 5 nm or more and 100 nm or less, and may also be 10 nm or more and 80 nm or less.

A chemical liquid is supplied to the upper surface Wa of the process target substrate Wp. The grooves Wg and the surface of the process target substrate Wp are therefore immersed in the chemical liquid when viewed microscopically. Note that the pattern of grooves Wg and structures Ws may be formed over the entire upper surface Wa of the process target substrate Wp. Alternatively, the pattern may be formed in part of the upper surface Wa of the process target substrate Wp.

Figure 6D:
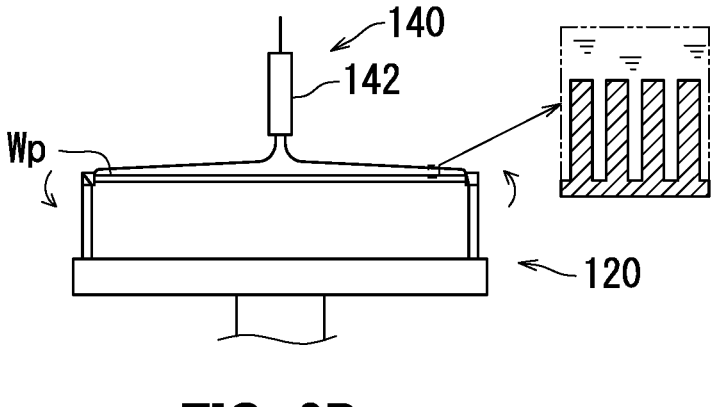

As illustrated in FIG. 6D, the process target substrate Wp is supplied with a rinse liquid. The rinse liquid supply section 140 supplies the rinse liquid to the process target substrate Wp. FIG. 6D corresponds to Step S20 in FIG. 5A.

Figure 6E:
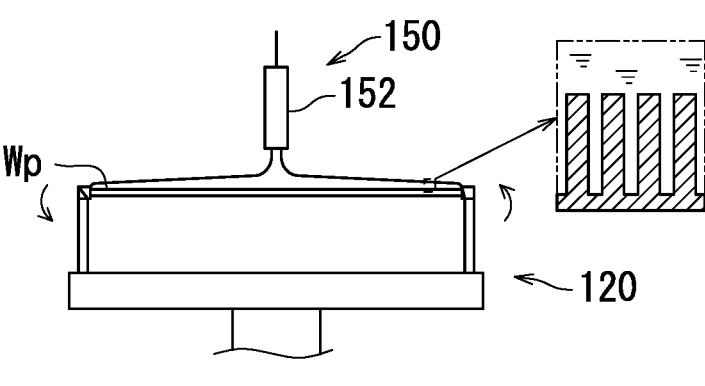

As illustrated in FIG. 6E, the process target substrate Wp is supplied with a replacement liquid. The replacement liquid supply section 150 supplies the replacement liquid to the process target substrate Wp. FIG. 6E corresponds to Step S30 in FIG. 5A.

Figure 7A:
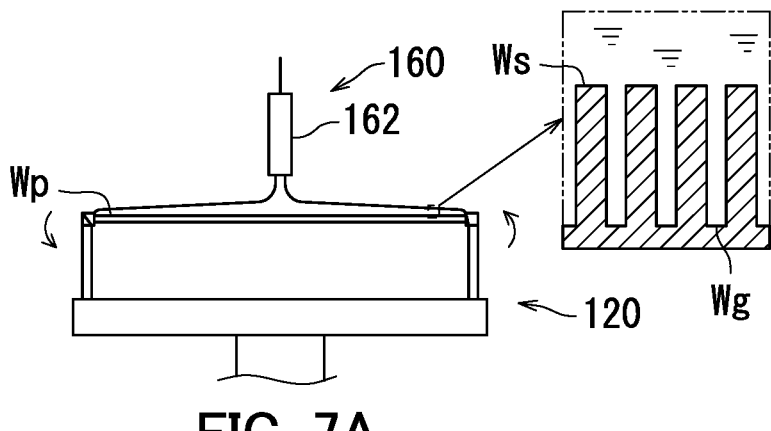
FIGS. 7A to 7C schematically illustrate a substrate processing method in the substrate processing apparatus according to the present embodiment.

As illustrated in FIG. 7A, the process target substrate Wp is supplied with a processing liquid. The processing liquid supply section 160 supplies the processing liquid to the process target substrate Wp. FIG. 7A corresponds to Step S41 in FIG. 5A. As illustrated in FIG. 7A, the surface and grooves in the process target substrate Wp are immersed in the processing liquid.

Here, a pattern of grooves Wg and structures Ws is partially formed in a process target substrate Wp. In this case, the processing liquid supply section 160 may first eject a processing liquid toward a region of the process target substrate Wp where the pattern of grooves Wg and structures Ws is partially formed. The processing liquid supply section 160 may subsequently move the nozzle 162 so that the ejected processing liquid is directed toward the center of the process target substrate Wp. Controlling the ejection pattern of the processing liquid in this manner enables the process target substrate Wp to be efficiently processed with a smaller amount of the processing liquid.

Figure 7B:
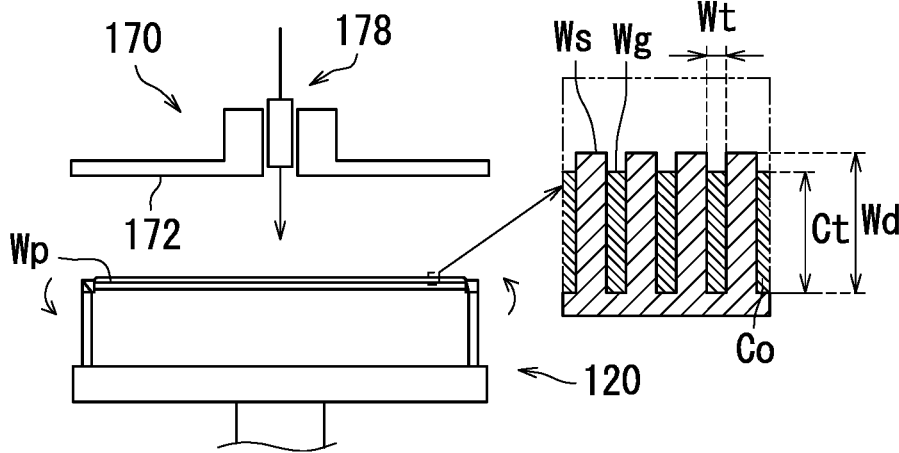

In the process target substrate Wp, the solvent evaporates from the processing liquid, so that the solids Co are formed as illustrated in FIG. 7B. FIG. 7B corresponds to Step S42 in FIG. 5A. Here, the process target substrate Wp is supplied with an inert gas from the inert gas supply section 178 of the shield member 170. This promotes the evaporation of the solvent from the processing liquid so as to maintain the vapor-liquid equilibrium, and the solids Co are formed in a short period of time.

In FIG. 7B, the thickness of solids Co is indicated as Ct. Here, the thickness Ct of solids Co is smaller than the depth Wd of grooves Wg. However, the thickness Ct of solids Co may be greater than the depth of grooves Wg. In this case, the solids Co communicate with each other above the grooves Wg as well as within the grooves Wg.

Figure 7C:
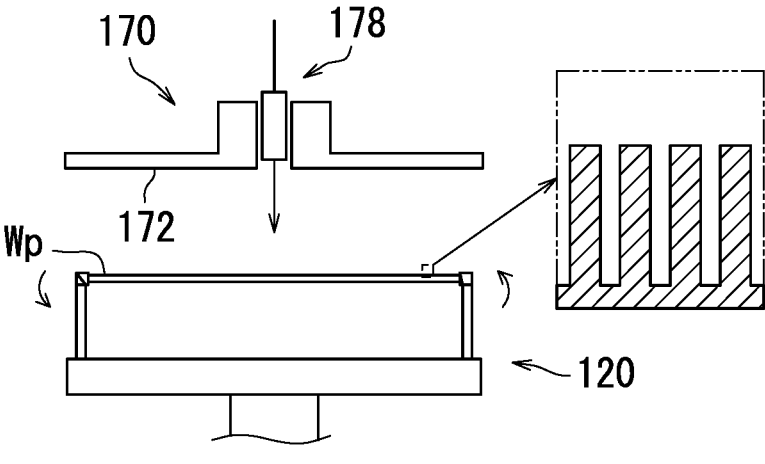

As illustrated in FIG. 7C, the solids Co sublimes in the process target substrate Wp. FIG. 7C corresponds to Step S43 in FIG. 5A. Here, the process target substrate Wp is supplied with an inert gas from the inert gas supply section 178 of the shield member 170. This promotes sublimation of the solids Co so as to maintain the vapor-liquid equilibrium, and the solids Co sublimes in a short period of time.

As described with reference to FIGS. 6 and 7, the substrate processing method according to the present embodiment enables performance of the chemical liquid process, the rinse process, the replacement process, and the sublimation drying process on the process target substrate Wp. It is consequently possible to process the process target substrate Wp with the chemical liquid and prevent the pattern of the structures from collapsing due to the drying of the chemical liquid.

As illustrated in FIG. 7B, when the solvent is evaporated from the processing liquid, the solids Co filling the grooves Wg in the process target substrate Wp are formed. Ease of collapse of the structures Ws varies greatly according to the ratio of the thickness Ct of solids Co to the depth Wd of grooves Wg. For example, the smaller the ratio of the thickness Ct of solids Co to the depth Wd of grooves Wg, the more easily the structures Ws collapse. On the other hand, the greater the ratio of the thickness Ct of solids Co to the depth Wd of grooves Wg, the less likely the structures Ws collapse. The thickness Ct of solids Co is therefore an important indicator of whether or not the structures Ws will collapse.

FIG. 6 has been referred to in the above description, and corresponds to processes to the chemical liquid process, the rinse process, and the replacement process from loading of the process target substrate Wp. FIG. 7 corresponds to the sublimation drying process on the process target substrate Wp. The sublimation drying process condition for the process target substrate Wp may be determined according to a process target substrate Wp to be loaded. For example, it is assumed that a substrate provided with a pattern of grooves and structures is loaded as a process target substrate Wp. In this case, the sublimation drying process condition may be determined at the stage when the process target substrate Wp is loaded.

Alternatively, the sublimation drying process condition may be determined according to the processes to the sublimation drying process in the substrate processing apparatus 100. For example, the attribute of grooves in a process target substrate Wp may vary according to the process by the substrate processing apparatus 100. In this case, the sublimation drying process condition may be determined according to the forming condition to the start of the sublimation drying process in the substrate processing apparatus 100.

As described above with reference to FIG. 1, the trained model LM is generated from the training data LD, and the training data LD is generated from the time series data TDL on the substrate processing apparatus 100L.

Figure 8:
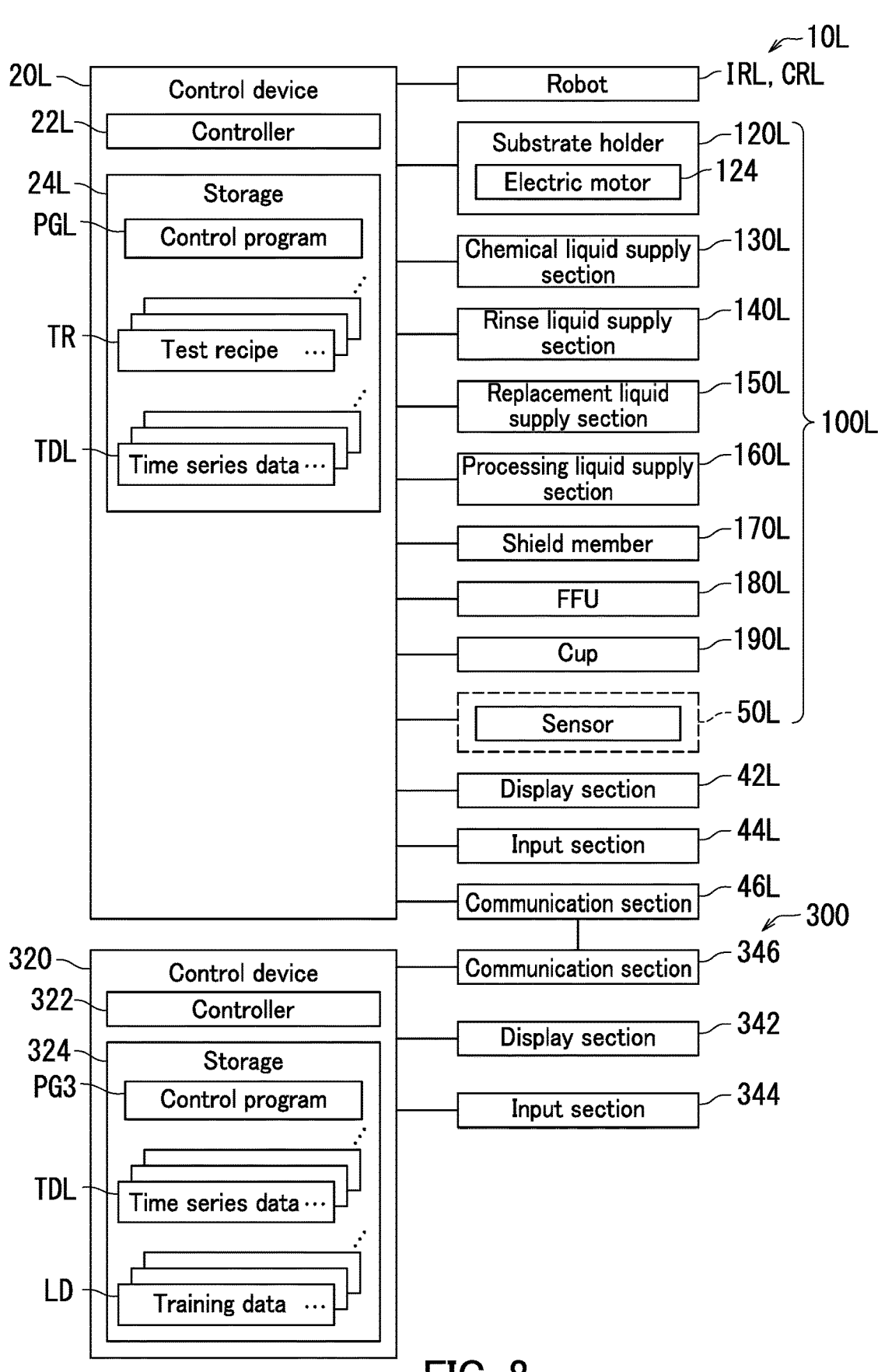
FIG. 8 is a block diagram of a training data generating apparatus and a substrate processing system including the substrate processing apparatus according to the present embodiment.

Next, a method of generating training data LD will be described with reference to FIGS. 1 to 8. FIG. 8 is a block diagram of a training data generating apparatus 300 and a substrate processing system 10L including a substrate processing apparatus 100L. Here, the training data generating apparatus 300 and the substrate processing apparatus 100L are connected and allowed to communicate with each other. The substrate processing system 10L including the substrate processing apparatus 100L of FIG. 8 is similar to the block diagram of the substrate processing system 10 illustrated in FIG. 10 except that storage 24L stores a test recipe TR without storing any trained model LM and a controller 22L includes neither the input information acquiring section 22a nor the sublimation drying process condition information acquiring section 22b. Duplicate descriptions are omitted to avoid redundancy.

The substrate processing system 10L includes a plurality of substrate processing apparatuses 100L, an indexer robot IRL, a center robot CRL, a control device 20L, a display section 42L, an input section 44L, a communication section 46L, and a sensor 50L. The substrate processing apparatuses 100L, the indexer robot IRL, the center robot CRL, the control device 20L, the display section 42L, the input section 44L, and the communication section 46L have the same configuration as the substrate processing apparatus 100, the indexer robot IR, the center robot CR, the control device 20, the display section 42, the input section 44, and the communication section 46 in the substrate processing system 10 illustrated in FIG. 4.

The substrate processing apparatus 100L includes a substrate holder 120L, a chemical liquid supply section 130L, a rinse liquid supply section 140L, a replacement liquid supply section 150L, a processing liquid supply section 160L, a shield member 170L, an FFU 180L, and a cup 190L. A chamber 110L, the substrate holder 120L, the chemical liquid supply section 130L, the rinse liquid supply section 140L, the replacement liquid supply section 150L, the processing liquid supply section 160L, the shield member 170L, the FFU 180L, and the cup 190L preferably have the same configuration as the chamber 110, the substrate holder 120, the chemical liquid supply section 130, the rinse liquid supply section 140, the replacement liquid supply section 150, the processing liquid supply section 160, the shield member 170, the FFU 180, and the cup 190, illustrated in FIGS. 3 and 4.

The control device 20L includes the controller 22L and the storage 24L. The storage 24L stores a control program PGL. The substrate processing apparatus 100L operates according to the procedure defined in the control program PGL.

The storage 24L also stores a plurality of test recipes TR. The test recipes TR include respective recipes of different sublimation drying process conditions. It is assumed that the controller 22L processes learning target substrates WL according to the test recipes TR. In this case, different sublimation drying processes are performed on different learning target substrates WL.

The storage 24L stores time series data TDL on the learning target substrates WL. The time series data TDL is data indicating temporal changes in physical quantities in the substrate processing apparatus 100L. The time series data TDL indicates a plurality of physical quantities detected by the sensor 50L. The time series data TDL may include data indicating a manufacturing process before the learning target substrates WL are processed by the substrate processing apparatus 100L. Note that the time series data TDL includes: substrate information including pattern forming condition information or substrate attribute information on the learning target substrates WL; processing liquid information; sublimation drying process condition information indicating sublimation drying process conditions performed on the learning target substrates WL; and process result information indicating results of the sublimation drying processes performed on the learning target substrates WL.

The training data generating apparatus 300 and the substrate processing apparatus 100L are connected and allowed to communicate with each other. The training data generating apparatus 300 transmits at least part of the time series data TDL on the substrate processing apparatus 100L.

The training data generating apparatus 300 includes a control device 320, a display section 342, an input section 344, and a communication section 346. The training data generating apparatus 300 is allowed to communicate with respective communication sections 46L of the plurality of substrate processing apparatuses 100L via the communication section 346. The display section 342, the input section 344, and the communication section 346 have the same configuration as the display section 42, the input section 44, and the communication section 46.

The control device 320 includes a controller 322 and storage 324. The storage 324 stores a control program PG3. The training data generating apparatus 300 operates according to the procedure defined in the control program PG3.

The controller 322 receives at least part of the time series data TDL from the substrate processing apparatus 100L, and stores the received time series data TDL in the storage 324. The storage 324 stores at least part of the time series data TDL on the learning target substrates WL. The time series data TDL is transmitted to the training data generating apparatus 300 from the substrate processing apparatus 100L via the communication sections 46L and 346. The controller 322 stores at least part of the transmitted time series data TDL in the storage 324. The time series data TDL stored in the storage 324 includes substrate information, processing liquid information, sublimation drying process condition information, and process result information in the time series data TDL.

The controller 322 acquires substrate information, processing liquid information, sublimation drying process condition information, and process result information on the learning target substrates WL from the time series data TDL of the storage 324. The controller 322 further consolidates the substrate information, the processing liquid information, the sublimation drying process condition information, and the process result information on the learning target substrates WL to generate training data LD. The storage 324 stores the training data LD.

Figure 9:
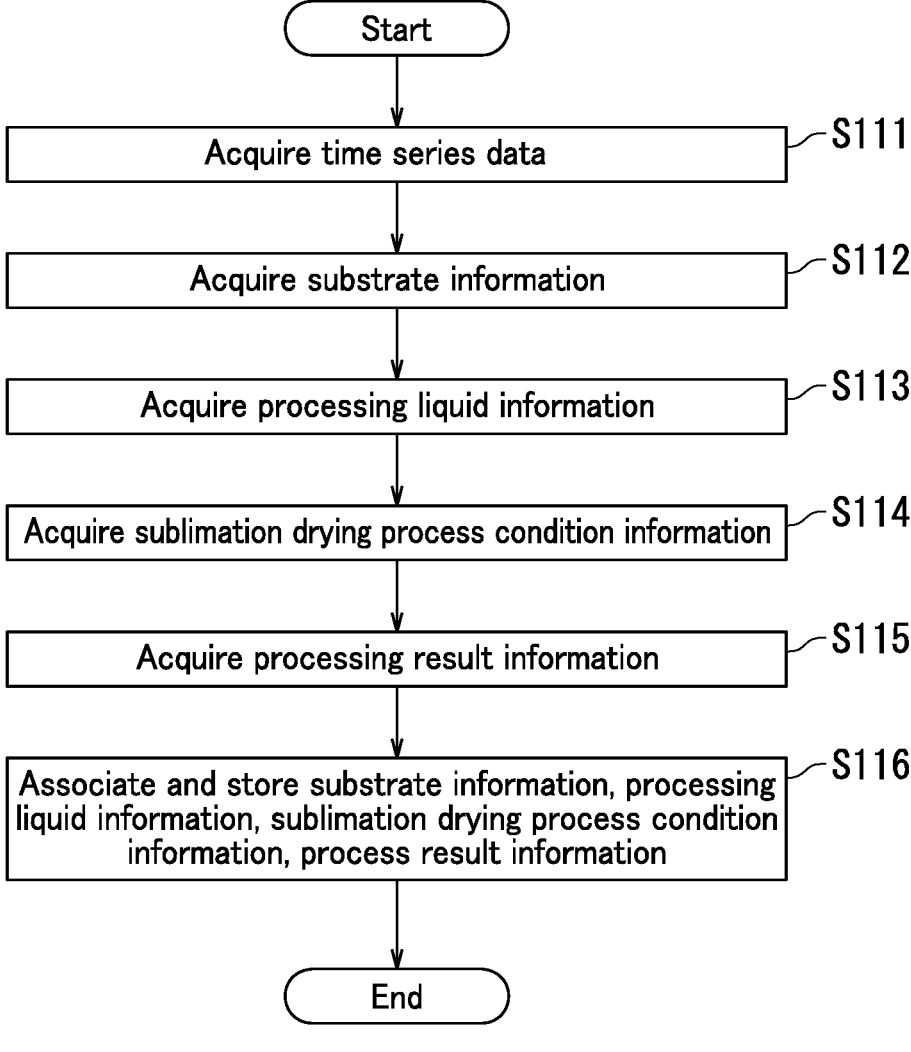
FIG. 9 is a flow chart illustrating a training data generating method according to the present embodiment.

Next, a training data generating method according to the present embodiment will be described with reference to FIGS. 8 and 9. FIG. 9 is a flowchart of the training data generating method according to the present embodiment. The training data is generated in the training data generating apparatus 300.

In Step S111, time series data TDL on learning target substrates WL is acquired as illustrated in FIG. 9. Typically, the training data generating apparatus 300 receives at least part of the time series data TDL on the learning target substrates WL from the substrate processing apparatus 100L. The storage 324 stores the received time series data TDL.

In Step S112, substrate information is extracted from the time series data TDL on the learning target substrates WL, stored in the storage 324. The substrate information includes at least one of both substrate attribute information and pattern forming condition information. The controller 322 acquires substrate information on the learning target substrates WL from the time series data TDL of the storage 324.

The substrate attribute information indicates the depth of grooves, for example. Alternatively, the substrate attribute information may indicate the width of grooves or the aspect ratio (depth/width) of grooves. The substrate attribute information may further indicate arrangement pattern of grooves and structures, intensity of grooves, density of grooves or structures, and opening ratio of grooves. The substrate attribute information may indicate surface area obtained by considering grooves having predetermined depth, width, and opening ratio about the learning target substrates WL.

The substrate attribute information may be information indicating affinity for water or composition of structures. For example, the information indicating the composition of structures indicates that the composition of structures is silicon oxide or silicon nitride. The information indicating the affinity for water of structures indicates that the structures are hydrophilic or hydrophobic.

In Step S113, processing liquid information is extracted from the time series data TDL on the learning target substrates WL, stored in the storage 324. The processing liquid information includes processing liquid attribute information indicating an attribute of a processing liquid. The controller 322 acquires the processing liquid information from the time series data TDL in the storage 324.

In Step S114, sublimation drying process condition information on the learning target substrates WL is extracted from the time series data TDL on the learning target substrates WL, stored in the storage 324. The controller 322 acquires the sublimation drying process condition information on the learning target substrates WL from the time series data TDL of the storage 324.

In Step S115, process result information on the learning target substrates WL is extracted from the time series data TDL on the learning target substrates WL, stored in the storage 324. The controller 322 acquires the process result information on the learning target substrates WL from the time series data TDL of the storage 324.

In Step S116, the substrate information, the processing liquid information, the sublimation drying process condition information, and the process result information on the learning target substrates WL are associated with each other to generate training data LD. The storage 324 stores training data LD for each of the learning target substrates WL.

In the present embodiment, the generated training data includes substrate information, processing liquid information, sublimation drying process condition information, and process result information that are associated with each other for each learning target substrate WL. Such training data is preferably used for a learning process.

In the description with reference to FIGS. 8 and 9, the training data LD on the learning target substrates WL is generated by associating the substrate information, the processing liquid information, the sublimation drying process condition information, and the process result information. However, the present embodiment is not limited to this. The training data LD may be generated by associating at least one of both substrate information and processing liquid information, sublimation drying process condition information, and process result information.

For example, it is assumed that training data L is generated by associating substrate information, sublimation drying process condition information, and process result information. In this case, sublimation drying process is performed on learning target substrates WL using processing liquids having the same attribute. It is also assumed that training data L is generated by associating processing liquid information, sublimation drying process condition information, and process result information. In this case, learning target substrates WL have the same substrate information.

In FIG. 8, the training data generating apparatus 300 and one substrate processing apparatus 100L are connected and allowed to communicate with each other. However, the present embodiment is not limited to this. The training data generating apparatus 300 and substrate processing apparatuses 100L may be connected and allowed to communicate with each other.

In the description with reference to FIGS. 8 and 9, the time series data TDL generated by the substrate processing apparatus 100L is transmitted to the training data generating apparatus 300 via the communication sections 46L and 346. However, the present embodiment is not limited to this. The control device 320 of the training data generating apparatus 300 may be incorporated in the control device 20L of the substrate processing system 10L including the substrate processing apparatus 100L. Here, training data LD may be generated from the time series data TDL in the substrate processing system 10L without the time series data TDL being transferred over the network.

Figure 10:
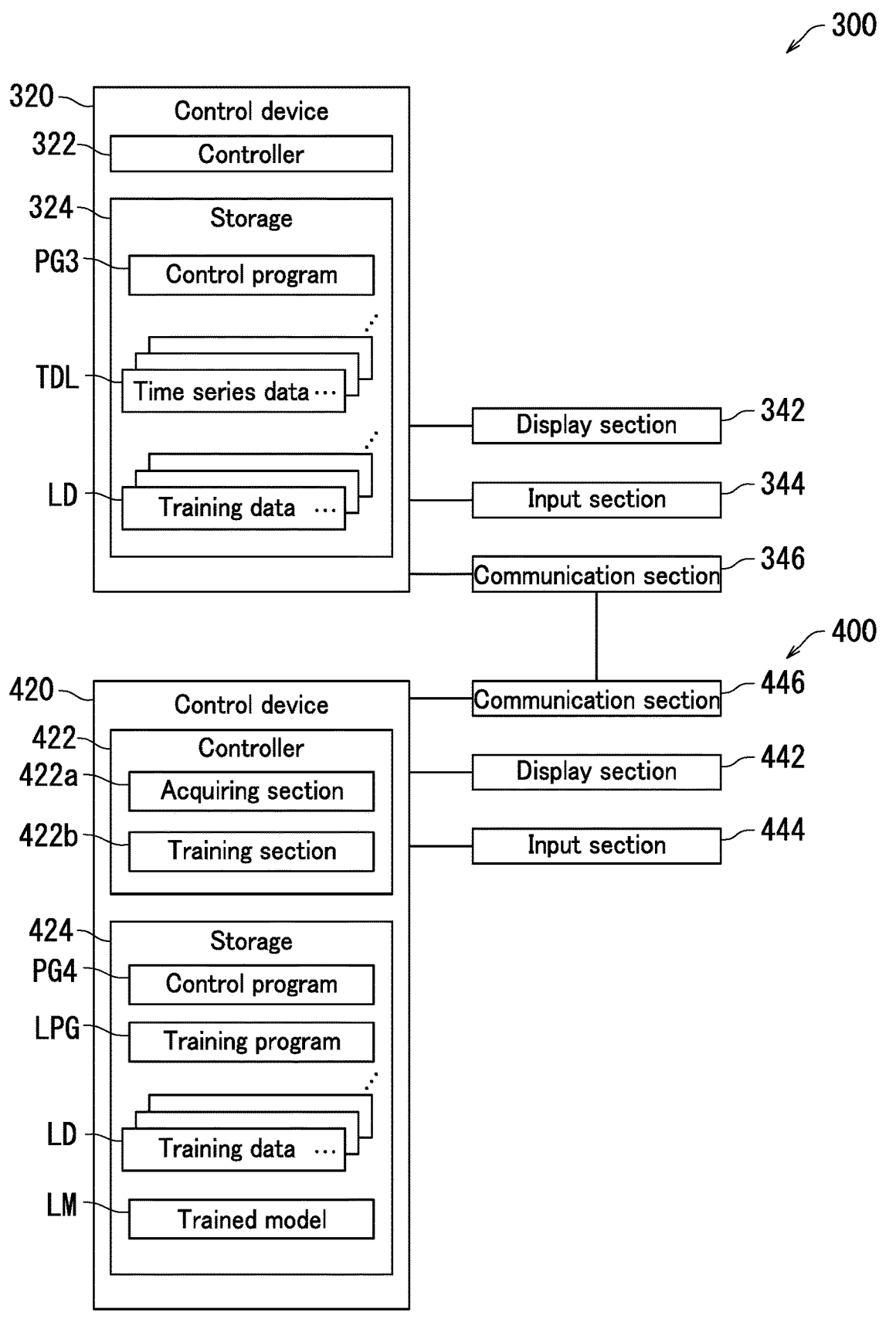
FIG. 10 is a block diagram of a training device and a training data generating apparatus according to the present embodiment.

Next, a trained model LM generating method according to the present embodiment will be described with reference to FIG. 10. FIG. 10 is a schematic diagram of a training data generating apparatus 300 and a training device 400 in the present embodiment. The training data generating apparatus 300 and the training device 400 are allowed to communicate with each other.

The training device 400 and the training data generating apparatus 300 are connected and allowed to communicate with each other. The training device 400 receives training data LD from the training data generating apparatus 300.

The training device 400 performs machine learning based on the training data LD to generate a trained model LM.

The training device 400 includes a control device 420, a display section 442, an input section 444, and a communication section 446. The display section 442, the input section 444, and the communication section 446 have the same configurations as the display section 42, the input section 44, and the communication section 46 of the substrate processing system 10 illustrated in FIG. 4.

The control device 420 includes a controller 422 and storage 424. The storage 424 stores a control program PG4. The training device 400 operates according to the procedure defined in the control program PG4.

The storage 424 stores training data LD. The training data LD is transmitted to the training device 400 from the training data generating apparatus 300 via the communication sections 346 and 446. The controller 422 stores the transmitted training data LD in the storage 424. In the training data LD stored in the storage 424, substrate information, processing liquid information, sublimation drying process condition information, and process result information in the time series data TDL are associated with each other.

The storage 424 stores a training program LPG The training program LPG is a program for executing a machine learning algorithm for finding certain rules from multiple pieces of training data LD and generating a trained model LM expressing the found rules. The controller 422 executes the training program LPG in the storage 424, thereby performing machine learning on the training data LD to adjust parameters of an inference program, thereby generating the trained model LM.

The machine learning algorithm is not particularly limited as long as it is supervised learning. Examples of the machine learning algorithm include a decision tree, a nearest neighbour algorithm, a naive Bayes classifier, a support vector machine, and a neural network. The trained model LM therefore includes the decision tree, the nearest neighbour algorithm, the naive Bayes classifier, the support vector machine, or the neural network. In the machine learning for generating the trained model LM, error backpropagation may be used.

For example, the neural network includes an input layer, one or more hidden layers, and an output layer. Specifically, the neural network is a deep neural network (DNN), a recurrent neural network (RNN), or a convolutional neural network (CNN), and performs deep learning. For example, the deep neural network includes an input layer, multiple hidden layers, and an output layer.

The controller 422 includes an acquisition section 422*a* and a training section 422*b*. The acquisition section 422*a* acquires training data LD from the storage 424. The training section 422*b* performs machine learning on the training data LD by executing the learning program LPG of the storage 424, and generates a trained model LM from the training data LD.

The training section 422*b* performs machine learning on multiple pieces of training data LD based on the learning program LPG As a result, a certain rule is found out of the multiple pieces of training data LD, and a trained model LM is generated. That is, the trained model LM is constructed by performing machine learning on the training data LD. The storage 424 stores the trained model LM.

Typically, the trained model LM is then transferred to the substrate processing system 10 illustrated in FIG. 4, and the storage 24 stores the trained model LM. In this case, as described above with reference to FIG. 4, the storage 24 of the control device 20 in the substrate processing system 10 stores the trained model LM. The sublimation drying process condition information acquiring section 22*b* acquires sublimation drying process condition information from the trained model LM in the storage 24.

However, the present embodiment is not limited to this. The sublimation drying process condition information acquiring section 22*b* may acquire the sublimation drying process condition information from the outside of the substrate processing system 10 with the storage 24 storing no trained model LM. In an example, the sublimation drying process condition information acquisition section 22*b* may transmit at least one of both substrate information and processing liquid information on process target substrates Wp to the trained model LM of the training device 400 via the communication sections 46 and 446. The sublimation drying process condition information acquisition section 22*b* may also receive the sublimation drying process condition information transmitted in the trained model LM from the training device 400 via the communication sections 446 and 46.

Figure 11:
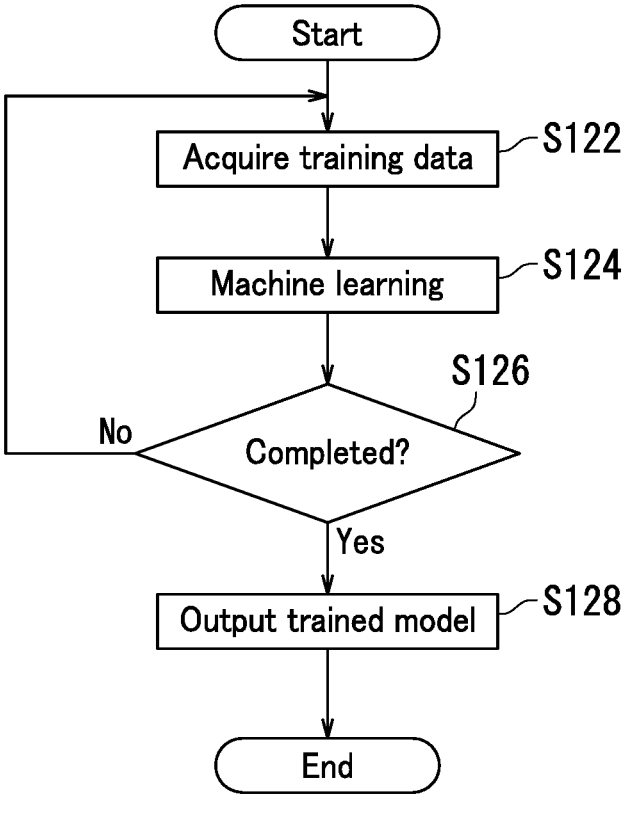
FIG. 11 is a flowchart illustrating a trained model generating method and a training method according to the present embodiment.

Next, a training method in the training device 400 according to the present embodiment will be described with reference to FIGS. 1 to 11. FIG. 11 is a flow diagram of the training method according to the present embodiment. Learning on the training data LD and generation of the trained model LM are performed in the training device 400.

In Step S122, the acquisition section 422*a* of the training device 400 acquires multiple pieces of training data LD from the storage 424 as illustrated in FIG. 11. In the training data LD, substrate information, processing liquid information, sublimation drying process condition information, and process result information on the learning target substrate WL are associated with each other.

In Step S124, the training section 422*b* then performs machine learning on multiple pieces of training data LD based on the learning program LPG In Step S126, the training section 422*b* then determines whether or not to end the machine learning on the training data LD. Whether or not to end the machine learning is determined according to predetermined conditions. For example, the machine learning ends when the machine learning is performed on a predetermined number or more of training data LD.

If the machine learning has not ended (No in Step S126), the process returns to Step S122. In this case, the machine learning is repeated. On the other hand, if the machine learning ends (Yes in Step S126), the process proceeds to Step S128.

In Step S128, the training section 422*b* outputs a model (one or more functions) to which a plurality of latest parameters (coefficients), that is, a plurality of trained parameters (coefficients) are applied, as a trained model LM. The storage 424 stores the trained model LM.

As described above, the training method ends and the trained model LM is generated. In the present embodiment, performing machine learning on the training data LD enables generation of the trained model LM.

In FIG. 10, the training device 400 and one training data generating apparatus 300 are connected and allowed to communicate with each other. However, the present embodiment is not limited to this. The training device 400 and a plurality of training data generating apparatuses 300 may be connected and allowed to communicate with each other.

In the description with reference to FIGS. 10 and 11, the training data LD generated by the training data generating apparatus 300 is transmitted to the training device 400 via the communication sections 346 and 446. However, the present embodiment is not limited to this. The control device 420 of the training device 400 may be incorporated into the control device 320 of the training data generating apparatus 300. In this case, the trained model LM may be generated from the training data LD in the training data generating apparatus 300 without the training data LD being transferred over the network.

In the description with reference to FIGS. 8 to 11, the time series data TDL generated by the substrate processing apparatus 100L is transmitted to the training data generating apparatus 300 via the communication sections 46L and 346. In addition, the training data LD generated by the training data generating apparatus 300 is transmitted to the training device 400 via the communication sections 346 and 446. However, the present embodiment is not limited to these. The control device 320 of the training data generating apparatus 300 and the control device 420 of the training device 400 may be incorporated in the control device 20L of the substrate processing system 10L. In this case, the trained model LM may be generated via the training data LD from the time series data TDL in the substrate processing system 10L without the time series data TDL and the training data LD being transferred over the network.

In the above description with reference to FIGS. 8 to 11, the substrate information on the learning target substrate WL is acquired. In addition, the processing liquid information indicating the attribute of the processing liquid used for the sublimation drying process on the learning target substrate WL is acquired. The substrate information and the processing liquid information are then included in the training data. However, the present embodiment is not limited to these. Either one of the substrate information and the processing liquid information may be included in the training data. Even in this case, the trained model LM can be generated by performing learning on the training data in which either one of the substrate information and the processing liquid information, the sublimation drying process condition information, and the process result information are associated and stored.

Figure 12:
FIG. 12 is a diagram illustrating learning data to be entered into the training device according to the present embodiment.

Next, an example of the training data LD will be described with reference to FIG. 12. FIG. 12 is a diagram illustrating an example of the training data LD. In FIG. 12, the training data LD includes multiple pieces of training data LD1 to LD1000.

The training data LD1 to LD1000 in FIG. 12 indicate substrate information, processing liquid information, sublimation drying process condition, and process result on the learning target substrate WL. For example, the substrate information includes at least one of both substrate attribute information and pattern forming condition information on the learning target substrate WL. In an example, the substrate information indicates depth, width, or aspect ratio of grooves in learning target substrates WL. Note that the depth, width, or aspect ratio of grooves in learning target substrates WL can be obtained by measuring the grooves in learning target substrates WL.

The processing liquid information indicates an attribute of processing liquids used for the sublimation drying processes on the learning target substrates WL. For example, the processing liquid information indicates the concentration or temperature of the processing liquids.

The sublimation drying process condition information indicates the condition on the sublimation drying process performed on the learning target substrates WL. Examples of the sublimation drying process condition include supply amount of processing liquids, ejecting pattern of processing liquids, and rotation speed of learning target substrates WL in sublimation drying process.

The process result information indicates process results of sublimation drying processes performed on the learning target substrates WL. The process results may be determined based on whether or not collapse of structures has been found on the learning target substrates WL. For example, it is assumed that a learning target substrate on which the sublimation drying process has been performed is good and does not show collapse of structures. In this case, it is indicated by "Good". On the other hand, when the collapse of structures is found and the result of the learning target substrate is not good, it is indicated by "Poor".

Training data LD1 indicates substrate information, processing liquid information, sublimation drying process condition, and process result of a training target substrate WL1. Here, in the training data LD1, La1 indicates substrate information on the learning target substrate WL1. Lb1 indicates processing liquid information about the processing liquid used for the learning target substrate WL1. Ls1 indicates the sublimation drying process condition performed on the learning target substrate WL1. Also, in the training data LD1, the learning target substrate on which the sublimation drying process has been performed is good and does not show collapse of the structures. The process result is therefore indicated by "Good".

Training data LD2 to LD1000 are generated corresponding to their respective learning target substrates WL2 to WL1000. Sublimation drying conditions performed on the learning target substrates WL2 to WL1000 may be the same or different. Even if the sublimation drying process conditions are the same, the process results greatly vary according to the substrate information and processing liquid information on the learning target substrates WL. Conversely, even if the substrate information and the processing liquid information on the learning target substrates WL are the same, the process results greatly vary according to respective sublimation drying process conditions on the learning target substrates WL.

The number of data is 1000 in the training data LD illustrated in FIG. 12. However, the present embodiment is not limited to this. The number of data may be smaller than 1000 and may be larger than 1000. However, it is preferable that the number of data is as large as possible.

The training data LD illustrated in FIG. 12 includes both the substrate information and the processing liquid information. However, the present embodiment is not limited to this. The learning data LD may include either one of the substrate information and the processing liquid information.

In the training data LD, the substrate information preferably includes multiple items. For example, the substrate information may include information indicating depth of grooves, width of grooves, aspect ratio of grooves, composition of structures (especially structure surface composition), and pattern arrangement of grooves and structures.

Figure 13:
FIG. 13 is a diagram illustrating training data to be entered into the training device according to the present embodiment.

Next, an example of the training data LD will be described with reference to FIG. 13. FIG. 13 is a diagram illustrating an example of the training data LD. The training data LD in FIG. 13 is the same as the training data LD described above with reference to FIG. 12 except that substrate information on learning target substrates WL indicates depth of grooves, width of grooves, aspect ratio of grooves, composition of structures, and pattern arrangement of grooves and structures. Duplicate descriptions are omitted to avoid redundancy.

In FIG. 13, the training data LD includes multiple pieces of training data LD1 to LD1000. Here, the substrate information includes groove depth information, groove width information, groove aspect ratio information, structure composition information, and pattern arrangement information. The groove depth information indicates the depth of grooves in training target substrates WL. The groove width information indicates the width of grooves in the training target substrates WL. The groove aspect ratio information indicates the aspect ratio (depth/width) of grooves in the training target substrates WL. Note that the depth, width and aspect ratio of grooves may be measured before the training target substrates WL are loaded into the substrate processing apparatus 100L. Alternatively, the depth, width, and aspect ratio of grooves may be measured before the substrate processing apparatus 100L performs the sublimation drying process on the learning target substrates WL.

The structure composition information indicates the composition of the surface portion of the structures in the learning target substrates WL. The pattern arrangement information indicates an arrangement pattern in which grooves and structures are formed in the learning target substrate WL.

Training data LD1 is information on a training target substrate WL1 and indicates substrate information, processing liquid information, sublimation drying process condition, and process result. Here, in the training data LD1, Lad1 indicates the depth of grooves in the learning target substrate WL1. Law1 indicates the width of grooves in the learning target substrate WL1. Laa1 indicates the aspect ratio of grooves in the learning target substrate WL1. Lam1 indicates the composition of structures in the learning target substrate WL1. Lap1 indicates the pattern arrangement of structures and grooves in the learning target substrate WL1.

The training data LD2 to LD1000 are generated corresponding to the learning target substrates WL2 to WL1000. The process results vary greatly according to respective pieces of substrate information on the learning target substrates WL. Therefore, even if processing liquids and sublimation drying processes are the same, the process results greatly vary according to the respective pieces of substrate information on the learning target substrates WL.

Preferably, the training data LD includes items that greatly contribute to fluctuations in the process results of the sublimation drying processes on the learning target substrates WL. In particular, the process results greatly vary according to the depth, width and aspect ratio of grooves in the learning target substrates WL. It is therefore preferable that the substrate information in the training data LD includes information indicating the depth, width, and aspect ratio of grooves in the learning target substrates WL.

The substrate information in the training data LD illustrated in FIG. 13 is substrate attribute information indicating at least one attribute on grooves and structures formed in the learning target substrates WL. However, the present embodiment is not limited to this. The substrate information may include pattern forming condition information indicating forming conditions for forming grooves and structures in the learning target substrates WL.

A pattern of grooves and structures is formed in a substrate W by dry etching, for example. In this case, the substrate information may be information indicating the dry etching condition. Alternatively, an attribute of grooves and structures in a substrate W varies according to a process in the substrate processing apparatus 100. In this case, the substrate information may be information indicating a condition of a process performed in the substrate processing apparatus 100.

Next, a substrate processing method according to the present embodiment will be described with reference to FIGS. 14A to 14E. FIGS. 14A to 14E schematically illustrate a process on a process target substrate Wp in the substrate processing method according to the present embodiment. FIGS. 14A to 14E are diagrams similar to FIGS. 6A to 6E except that the depth of grooves in the process target substrate Wp varies according to a chemical liquid in a substrate processing apparatus 100.

Figure 14A:
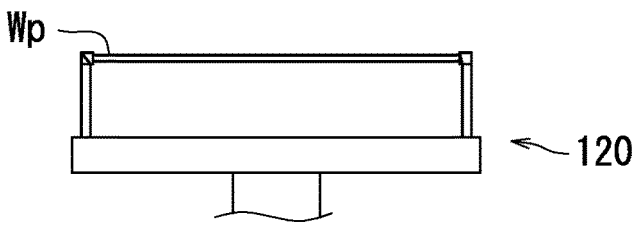
FIGS. 14A to 14E schematically illustrate a substrate processing method in the substrate processing apparatus according to the present embodiment.

A substrate holder 120 is loaded with the process target substrate Wp as illustrated in FIG. 14A. FIG. 14A corresponds to Step SA in FIG. 5A.

Figure 14B:
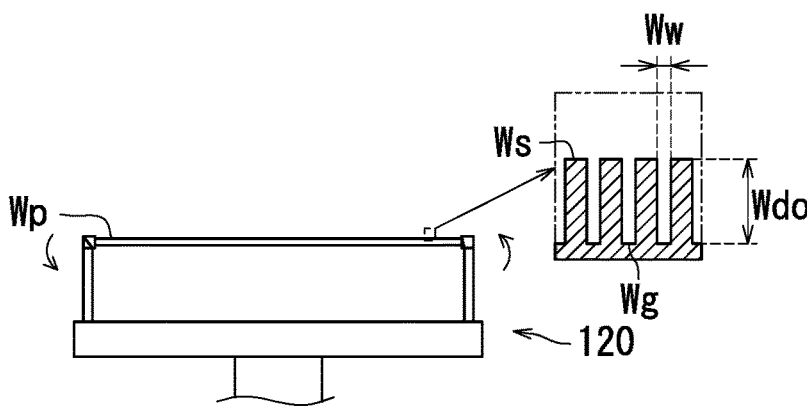

The process target substrate Wp starts rotating as illustrated in FIG. 14B. The substrate holder 120 starts rotating together with the loaded process target substrate Wp. FIG. 14B illustrates an enlarged view of a pattern of grooves Wg and structures Ws in a region of the process target substrate Wp. Here, the grooves Wg are formed at regular intervals in the process target substrate Wp loaded into the substrate processing apparatus 100, so that the structures Ws are formed. Here, the depth of grooves Wg is Wd0, and the width of grooves Wg is Ww.

Figure 14C:
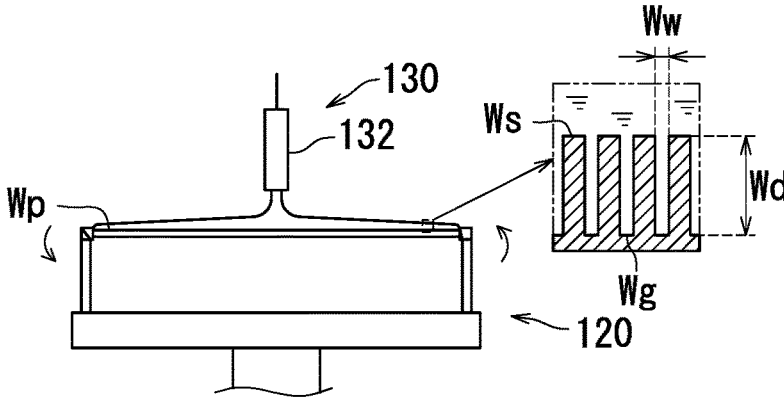

The process target substrate Wp is supplied with a chemical liquid as illustrated in FIG. 14C. A chemical liquid supply section 130 supplies the chemical liquid to the process target substrate Wp. The grooves are formed in the process target substrate Wp by the supplied chemical liquid. FIG. 14C illustrates an enlarged view of the pattern of grooves Wg and structures Ws in the region of the process target substrate Wp like FIG. 6C. The depth of grooves Wg varies from Wd0 to Wd by the chemical liquid process.

Figures 14D, 14E:
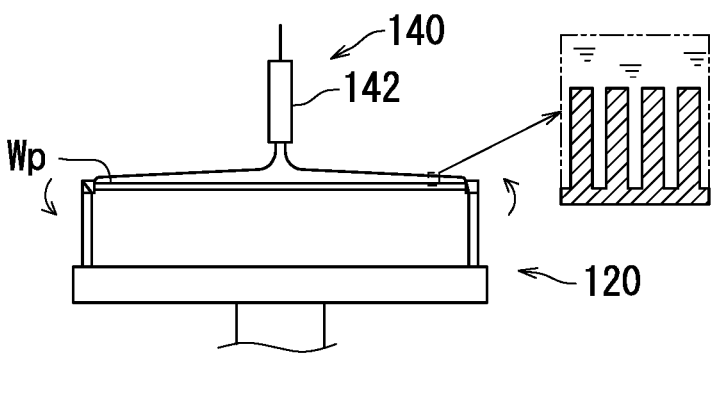

The process target substrate Wp is supplied with a rinse liquid as illustrated in FIG. 14D. The rinse liquid supply section 140 supplies the rinse liquid to the process target substrate Wp. FIG. 6D corresponds to Step S20 in FIG. 5A.

The process target substrate Wp is supplied with a replacement liquid as illustrated in FIG. 14E. The replacement liquid supply section 150 supplies the replacement liquid to the process target substrate Wp. FIG. 14E corresponds to Step S30 in FIG. 5A.

The subsequent sublimation drying process is the same as the description above with reference to FIG. 7. The description is therefore omitted. As described above, the grooves Wg and the structures Ws in the process target substrate Wp may vary according to the process by the substrate processing apparatus 100. In this case, the attribute of the pattern of grooves Wg and structures Ws varies according to the pattern forming condition in the substrate processing apparatus 100. The sublimation drying process condition information may therefore be acquired based on the pattern forming condition information instead of the substrate attribute information.

Figure 15:
FIG. 15 is a diagram illustrating training data to be entered into the training device according to the present embodiment.

Next, an example of training data LD when substrate information indicates a pattern forming condition will be described with reference to FIG. 15. FIG. 15 is a diagram illustrating the example of training data LD. Substrate information on a learning target substrate WL in the training data LD in FIG. 15 is the same as the training data LD described above with reference to FIG. 12 except that the substrate information indicates a pattern forming condition that varies the attribute of grooves and the structures. Duplicate descriptions are omitted to avoid redundancy.

In FIG. 15, the training data LD includes multiple pieces of training data LD1 to LD1000. Here, the substrate information indicates concentration, temperature, and supply amount of a chemical liquid that varied the attribute of grooves and structures in the learning target substrate WL.

The substrate information includes chemical liquid concentration information indicating the concentration of the chemical liquid, chemical liquid temperature information indicating the temperature of the chemical liquid, and chemical liquid supply amount information indicating the supply amount of the chemical liquid.

The training data LD1 is information on a learning target substrate WL1 and indicates substrate information, processing liquid information, sublimation drying process condition, and a process result. Here, in the training data LD1, Lac indicates the concentration of the chemical liquid used for the learning target substrate WL1. Lat1 indicates the temperature of the chemical liquid used for the learning target substrate WL1. Lav1 indicates the supply amount of the chemical liquid used for the learning target substrate WL1.

The training data LD2 to LD1000 are generated corresponding to their respective learning target substrates WL2 to WL1000. Respective process results vary greatly according to their respective forming conditions that vary respective attributes of grooves in the learning target substrates WL. Preferably, the training data LD has items that greatly contribute to fluctuations in the process results of the sublimation drying processes on the learning target substrates WL.

In the above description with reference to FIG. 14, the depth of grooves Wg in the substrate W varies according to the processing liquid. However, the present embodiment is not limited to this. The shape of grooves Wg in the substrate W may vary according to the processing liquid.

Figure 16A:
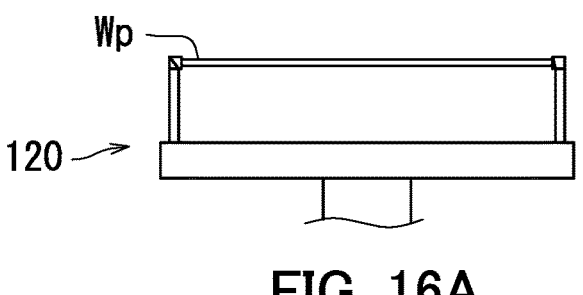
FIG. 16A to 16C schematically illustrate a substrate processing method in the substrate processing apparatus according to the present embodiment.
Figure 16B:
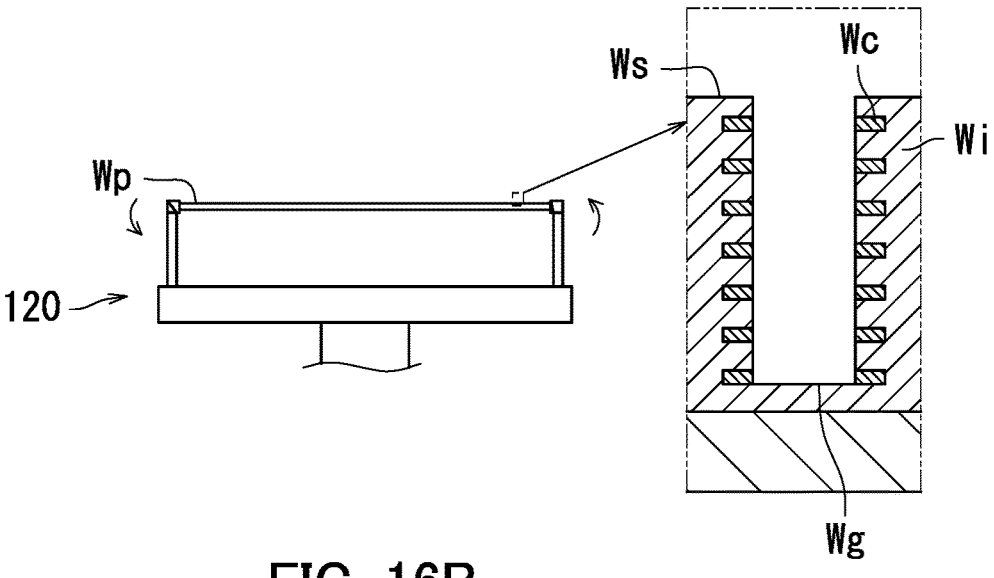
Figure 16C:
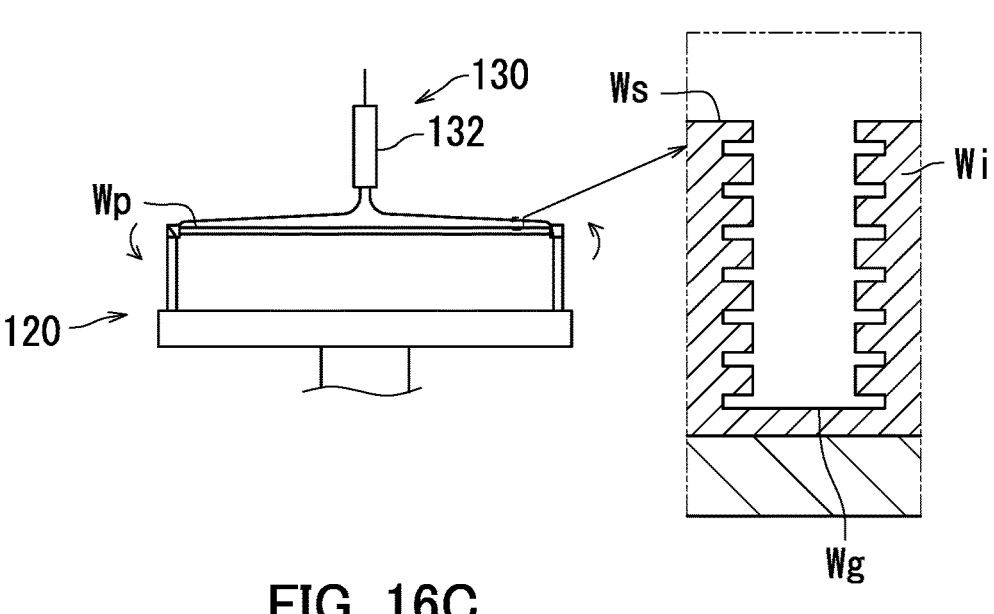

Next, a substrate processing method according to the present embodiment will be described with reference to FIGS. 16A to 16C. FIGS. 16A to 16C schematically illustrate a process on a process target substrate Wp in the substrate processing method according to the present embodiment. FIGS. 16A to 16C illustrate diagrams similar to FIGS. 14A to 14C except that the depth of grooves in the process target substrate Wp varies according to a chemical liquid in a substrate processing apparatus 100. Duplicate descriptions are omitted to avoid redundancy.

A substrate holder 120 is loaded with the process target substrate Wp as illustrated in FIG. 16A. FIG. 16A corresponds to Step SA in FIG. 5A.

The process target substrate Wp starts rotating as illustrated in FIG. 16B. The substrate holder 120 starts rotating together with the process target substrate Wp that has been loaded. FIG. 16B illustrates an enlarged view of a pattern of grooves Wg and structures Ws in a region of the process target substrate Wp.

Here, a structure Ws contains an insulating layer Wi and conductive layers Wc. The insulating layer Wi contains silicon oxide or silicon nitride. The conductive layers Wc contain polysilicon. In the structure Ws, the conductive layers Wc are separately arranged in the insulating layer Wi.

A chemical liquid is supplied to the process target substrate Wp as illustrated in FIG. 16C. A chemical liquid supply section 130 supplies the chemical liquid to the process target substrate Wp. The chemical liquid is supplied, so that grooves are formed in the process target substrate Wp.

FIG. 16C illustrates an enlarged view of the pattern of grooves Wg and structures Ws in the region of the process target substrate Wp like FIG. 14C. The conductive layers Wc are etched and removed by the chemical liquid, whereas the insulating layer Wi is not.

Subsequently, a rinse process, a replacement liquid process, and a sublimation drying process are performed in the same manner as the description above with reference to FIGS. 6, 7 and 14. The description is therefore omitted. As described above, the grooves Wg and the structures Ws in the process target substrate Wp may vary according to the process by the substrate processing apparatus 100. Such a substrate processing apparatus 100 is suitably used for manufacturing substrates W having a 3D NAND structure.

In the description with reference to FIG. 16, the conductive layers Wc are selectively etched by the chemical liquid process, and the grooves Wg spread in the lateral direction. Thus, the attribute of the pattern of grooves Wg and structures Ws varies according to the pattern forming condition in the substrate processing apparatus 100. The sublimation drying process condition information may therefore be acquired based on the pattern forming condition information instead of the substrate attribute information.

The training data LD including substrate information with a plurality of items has been described with reference to FIGS. 13 and 15. The processing liquid information may however include a plurality of items in the training data LD.

Figure 17:
FIG. 17 is a diagram illustrating training data to be entered into the training device according to the present embodiment.

Next, an example of training data LD in which processing liquid information includes a plurality of items will be described with reference to FIG. 17. FIG. 17 illustrates an example of the training data LD. The training data LD of FIG. 17 is the same as the training data LD described above with reference to FIG. 12 except that processing liquid information about a processing liquid used for a sublimation drying process on a learning target substrate WL indicates the concentration and temperature of the processing liquid. Duplicate descriptions are omitted to avoid redundancy.

In FIG. 17, the training data LD includes multiple pieces of training data LD1 to LD1000. Here, processing liquid information includes processing liquid concentration information and processing liquid temperature information. The processing liquid concentration information indicates the concentration of the processing liquid. The processing liquid temperature information indicates the temperature of the processing liquid.

The training data LD1 is information on a learning target substrate WL1 and indicates substrate information, processing liquid information, a sublimation drying process condition, and a process result. Here, in the training data LD1, Lbc1 indicates the concentration of the processing liquid used for the sublimation drying process on the learning target substrate WL1. Lbt1 indicates the temperature of the processing liquid used for the sublimation drying process on the learning target substrate WL1.

Multiple pieces of training data LD2 to LD1000 are generated corresponding to the learning target substrates WL2 to WL1000. The process result greatly varies according to the processing liquid information on the learning target substrate WL even if the substrate information and the sublimation drying process are the same. The process result greatly varies according to the concentration of the processing liquid in particular, and it is therefore preferable that the processing liquid information in the training data LD includes information indicating the concentration of the processing liquid.

The training data LD in which the substrate information or the processing liquid information includes a plurality of items has been described above with reference to FIGS. 13, 15 and 17. In the training data LD, the sublimation drying process condition information may include a plurality of items.

Next, an example of training data LD in which sublimation drying process condition information includes a plurality of items will be described with reference to FIG. 18. FIG. 18 illustrates an example of the training data LD. The training data LD of FIG. 18 is the same as the training data LD described above with reference to FIG. 12 except that sublimation drying process condition information about a sublimation drying process performed on a learning target substrate WL indicates a processing liquid supply amount, a processing liquid ejecting pattern, a rotation speed of the learning target substrate WL, and a flow rate of an inert gas. Duplicate descriptions are omitted to avoid redundancy.

In FIG. 18, the training data LD includes multiple pieces of training data LD1 to LD1000. Here, sublimation drying process condition information includes processing liquid supply amount information, processing liquid ejecting pattern information, rotation speed information, and inert gas flow rate information. The processing liquid supply amount information indicates a supply amount of the processing liquid. The processing liquid ejecting pattern information indicates a temporal change in the position of the nozzle of the processing liquid supply section 160L when ejecting the processing liquid. The rotation speed information indicates the rotation speed of the learning target substrate WL in the sublimation drying process. The inert gas flow rate information indicates the flow rate of an inert gas supplied in the sublimation drying process.

The training data LD1 is information on a learning target substrate WL1 and indicates substrate information, processing liquid information, a sublimation drying process condition, and a process result. Here, in the training data LD1, Lsv1 indicates the supply amount of a processing liquid used for a sublimation drying process on the learning target substrate WL1. Lsi1 indicates the temporal change in the position of the nozzle of the processing liquid supply section 160L with respect to the learning target substrate WL1. Lsr1 indicates the rotation speed of the learning target substrate WL1 in the sublimation drying process. Lsn1 indicates the flow rate of an inert gas supplied to the learning target substrate WL1 during the sublimation drying process.

The multiple pieces of training data LD2 to LD1000 are generated corresponding to the learning target substrates WL2 to WL1000. The process results vary greatly according to the sublimation drying processes on the learning target substrates WL. Even if the substrate information and the processing liquid information are the same, their respective process results greatly vary according to the sublimation drying processes on the learning target substrates WL. Preferably, the training data LD includes items that greatly contribute to fluctuations in the process results of the sublimation drying processes on the learning target substrates WL.

Figure 19A:
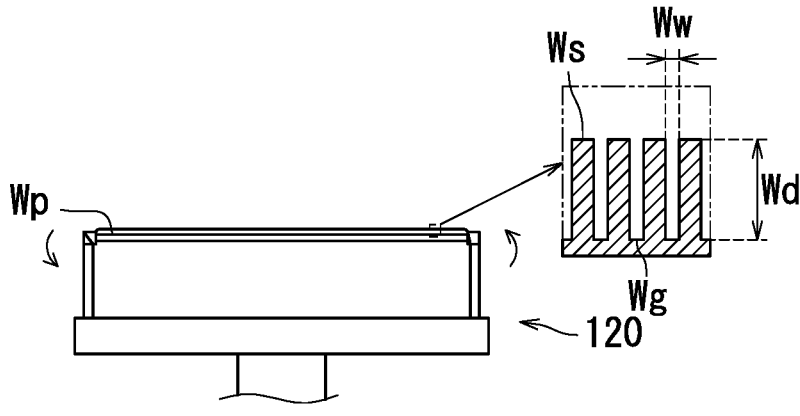
FIG. 19A is a schematic diagram of a process target substrate including a pattern of grooves and structures to be processed by the substrate processing apparatus according to the present embodiment.
Figure 19B:
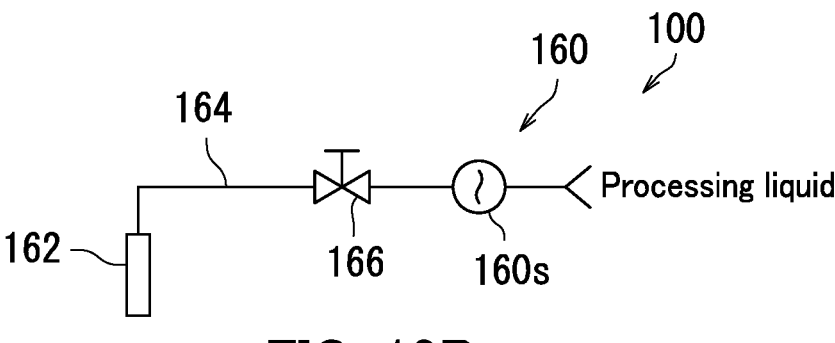
FIG. 19B is a schematic diagram of a processing liquid supply section in the substrate processing apparatus.
Figure 19C:
FIG. 19C is a diagram illustrating a sublimation drying process condition acquired based on substrate information and processing liquid information.

Next, a substrate process by the substrate processing apparatus 100 according to the present embodiment will be described with reference to FIGS. 1 to 19. FIG. 19A schematically illustrates a process target substrate Wp. FIG. 19B illustrates a processing liquid supply section 160 in the substrate processing apparatus 100. FIG. 19C illustrates sublimation drying process condition information Rp output from a learned model LM.

A pattern of grooves Wg and structures Ws is formed in the process target substrate Wp as illustrated in FIG. 19A. Here, the depth of grooves Wg is Wd. The width of grooves Wg is Ww. The aspect ratio of grooves Wg is Wd/Ww.

Note that the substrate processing apparatus 100 may be loaded with the process target substrate Wp on which the pattern of grooves and structures are formed. In this case, the attribute of grooves Wg and structures Ws may be measured before the substrate processing apparatus 100 is loaded with the process target substrate Wp, or may be measured after the substrate processing apparatus 100 is loaded therewith.

Note that the attribute of grooves and structures in the process target substrate Wp may vary in the substrate processing apparatus 100.

The processing liquid supply section 160 further includes a sensor 160s as illustrated in FIG. 19B. The sensor 160s measures the attribute of the processing liquid flowing in the pipe 164. The sensor 160s measures the concentration of the processing liquid, for example. Note that in the processing liquid supply section 160, the concentration may be set in advance according to the production condition of the processing liquid.

In this case, sublimation drying condition information Rp can be acquired by entering, as input information, groove depth information, groove width information, and processing liquid concentration information in the trained model LM.

FIG. 19C illustrates sublimation drying process condition information Rp. The sublimation drying process condition information Rp includes a supply amount of a processing liquid to the process target substrate Wp, an ejecting pattern of processing liquid, a rotation speed of the process target substrate Wp in the sublimation drying process, and an inert gas flow rate.

In the sublimation drying process condition information Rp, Rsv indicates the supply amount of the processing liquid used for the process target substrate Wp. Rsi indicates an ejecting pattern of the processing liquid used for the process target substrate Wp. Rsr indicates the rotation speed of the process target substrate Wp in the sublimation drying process. Rsn indicates the flow rate of the inert gas supplied when the sublimation drying process is performed on the process target substrate Wp.

In this case, the controller 22 controls the substrate holder 120, the processing liquid supply section 160, and the shield member 170 so that the sublimation drying process is performed on the process target substrate Wp according to the sublimation drying process condition indicated in the sublimation drying process condition information Rp. As a result, the process target substrate Wp can be dried appropriately while suppressing collapse of the structures Ws.

In the description with reference to FIGS. 18 and 19, the sublimation drying process condition include four items: the processing liquid supply amount, the ejecting pattern of processing liquid, the rotation speed of the process target substrate, and the inert gas flow rate. However, the present embodiment is not limited to this. The sublimation drying process condition may include any one or more of the four items. Alternatively, the sublimation drying process condition may be a combination of one or more of the four items and another item. The sublimation drying process condition may also include one or more items different from the four items.

Note that the substrate processing apparatus 100 of the same or the same type may process the process target substrates Wp for different purposes having different groove attributes (for example, groove depth, width, or aspect ratio). Typically, the aspect ratio of grooves required in the process target substrates Wp for logic applications is different from the aspect ratio of grooves required in the process target substrates Wp for memory applications. However, the same or the same type of substrate processing apparatus 100 may be used for manufacturing processing target substrates Wp for logic applications and processing target substrates Wp for memory applications.

In this case, the substrate processing apparatus 100 can perform the sublimation drying process on the process target substrates Wp for logic applications according to the sublimation drying process condition suitable for the grooves in the process target substrates Wp for logic applications. The sublimation drying process can also be performed on the process target substrates Wp for memory applications according to the sublimation drying process condition suitable for the grooves in the process target substrates Wp for memory applications. The substrate processing apparatus 100 can further perform the sublimation drying process according to the sublimation drying process condition suitable for the grooves in the processing target substrates Wp in different processes even if the processing target substrates Wp are used for the same purpose.

In the training data LD illustrated in FIGS. 12, 13, 15, and 17 to 18, a good process result is indicated by Good, and no good process result is indicated by Poor. Thus, the process results of the training data LD is binarized. However, the present embodiment is not limited to this. The process results may be classified into three or more categories. The process results may be indicated by a count value of collapsed structures. Alternatively, the process results may be indicated by a collapse ratio of the number of collapsed structures to the number of structures to be formed on the substrate.

For example, the process results may be classified into any value between the minimum and maximum values. For example, the process results may be quantified in consideration of the usage amount (supply amount) of the processing liquid, the time required for the sublimation drying process or the like in addition to the characteristics of learning target substrates WL.

Figure 20:
FIG. 20 is a diagram illustrating training data to be entered into the training device according to the present embodiment.

Next, an example of training data LD in which the process condition is indicated by percentage will be described with reference to FIG. 20. FIG. 20 illustrates an example of training data LD. The training data LD in FIG. 20 is the same as the training data LD described above with reference to FIG. 12 except that process results indicate respective collapse rates. Duplicate descriptions are omitted to avoid redundancy.

In FIG. 20, the training data LD includes multiple pieces of training data LD1 to LD1000. Here, process results are indicated by a collapse rate that is a ratio of the number of collapsed structures to the number of structures to be formed on a corresponding learning target substrate WL.

Training data LD1 is information on a learning target substrate WL1 and indicates substrate information, processing liquid information, sublimation drying process conditions, and process results. Here, a collapse rate of structures in the training data LD1 is 32%. The collapse rate of structures can be acquired by analyzing the learning target substrate WL1 on which the sublimation drying process is performed, for example Multiple pieces of training data LD2 to LD1000 are generated corresponding to learning target substrates WL2 to WL1000. At least one of both the substrate information and the processing liquid information on the process target substrates Wp is entered in the trained model LM generated from training data LD including numerical process results. As a result, sublimation drying process conditions suitable for the process target substrates Wp can be acquired with higher accuracy.

The specific examples have been described separately for each of substrate information, processing liquid information, sublimation drying process conditions, and process results on the training data LD. Preferably, in the training data LD, arbitrary items are combined and included in each of substrate information, processing liquid information, sublimation drying process conditions, and process results.

Note that any item in the training data LD may include a temporally varying profile. For example, the concentration and temperature of the processing liquid may be adjusted over time.

Figure 21:
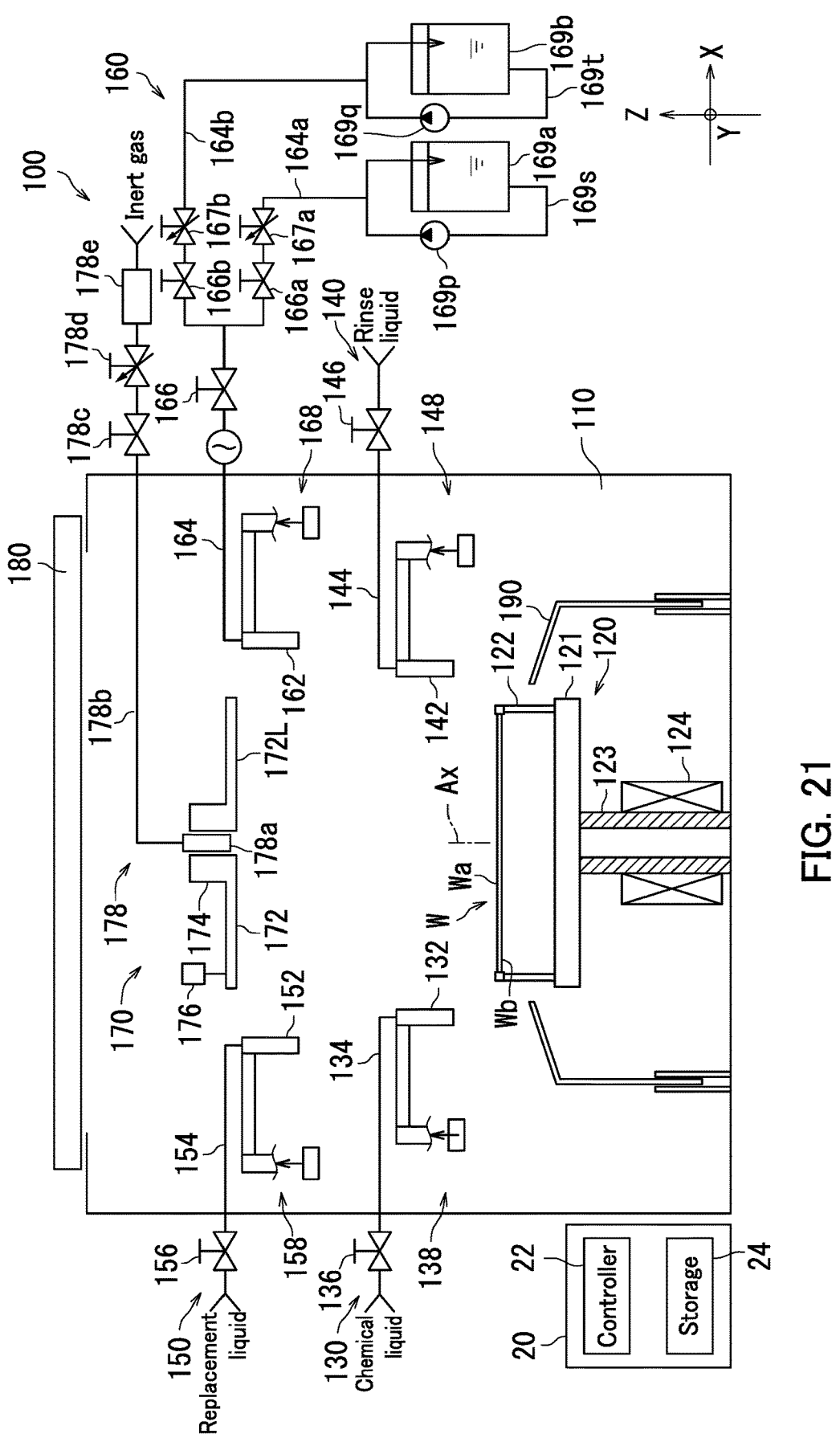
FIG. 21 is a schematic diagram of a substrate processing apparatus according to the present embodiment.

Next, a substrate processing apparatus 100 according to the present embodiment will be described with reference to FIG. 21. FIG. 21 is a schematic diagram of the substrate processing apparatus 100 according to the present embodiment. The substrate processing apparatus 100 of FIG. 21 is similar to the substrate processing apparatus 100 described above with reference to FIG. 3 except that the concentration and temperature of a processing liquid supplied from a processing liquid supply section 160 can be adjusted. Duplicate descriptions are omitted to avoid redundancy.

In the substrate processing apparatus 100 according to the present embodiment in FIG. 21, the processing liquid supply section 160 supplies a substrate W with a processing liquid. The processing liquid is a cyclohexanone oxime solution, for example. The cyclohexanone oxime solution is produced by mixing cyclohexanone oxime with a solvent. The solvent is IPA, for example. The processing liquid supply section 160 can change the concentration of the processing liquid to supply the processing liquid to the substrate W.

In addition to the nozzle 162, the pipe 164, the valve 166, and the nozzle moving section 168, the processing liquid supply section 160 includes individual pipes 164a and 164b, valves 166a and 166b, flow rate control valves 167a and 167b, circulation pipes 169s and 169t, tanks 169a and 169b, and pumps 169p and 169q.

The tank 169a stores a processing liquid. The circulation pipe 169s is connected to the tank 169a. A first end of the circulation pipe 169s communicates with part of the tank 169a. A second end of the circulation pipe 169s communicates with another part of the tank 169a. The pump 169p is placed in the circulation pipe 169s. The pump 169p is driven, and then the processing liquid in the tank 169a circulates through the circulation pipe 169s.

The individual pipe 164a is connected to the circulation pipe 169s and the pipe 164. The individual pipe 164a is connected to part of the circulation pipe 169s and one end of the pipe 164. The pump 169p is driven, and then the processing liquid in the tank 169a is sent to the individual pipe 164a. The valve 166a and the flow rate control valve 167a are placed in the individual pipe 164a. The valve 166a opens and closes a flow channel in the individual pipe 164a. The flow rate control valve 167a adjusts the amount of the processing liquid passing through the individual pipe 164a.

The tank 169b stores a processing liquid. The circulation pipe 169t is connected to the tank 169b. A first end of the circulation pipe 169t communicates with part of the tank 169b. A second end of circulation line 169t communicates with another part of tank 169b. The pump 169q is placed in the circulation pipe 169t. The pump 169q is driven, and then the processing liquid in the tank 169b circulates through the circulation pipe 169t.

The individual pipe 164a is connected to the circulation pipe 169t and the pipe 164. The individual pipe 164a is connected to part of the circulation pipe 169t and one end of the pipe 164. The pump 169q is driven, and then the processing liquid in the tank 169b is sent to the individual pipe 164b. The valve 166b and the flow control valve 167b are placed in the individual pipe 164b. The valve 166b opens and closes a flow channel in the individual pipe 164b. The flow rate control valve 167b adjusts the amount of the processing liquid passing through the individual pipe 164b.

The concentration of the processing liquid in the tank 169a (concentration of a substance to sublime, which is contained in the processing liquid) is different from the concentration of the processing liquid in the tank 169*b*. Therefore, when the valves 166*a* and 166*b* are opened, the processing liquids having different concentration are mixed in the pipe 164, and the uniformly mixed processing liquid is ejected from the nozzle 162. It is also possible to change the concentration of the processing liquid ejected from the nozzle 16 by changing the opening degree of at least one of both the flow rate control valve 167*a* and the flow rate control valve 167*b*.

The controller 20 sets respective opening degrees of the valves 166*a* and 166*b*, and the flow rate control valves 167*a* and 167*b* based on the specified concentration of the processing liquid. It is therefore possible to change the flow rate of the processing liquid flowing through the individual pipes 164*a* and 164*b* by adjusting the flow rate control valves 167*a* and 167*b*.

Figure 22:
FIG. 22 is a diagram illustrating training data to be entered into the training device according to the present embodiment.

Next, training data LD used for a training method according to the present embodiment will be described with reference to FIG. 22. FIG. 22 illustrates an example of the training data LD. The training data LD in FIG. 22 is preferably used to generate a trained model LM of the substrate processing apparatus 100 illustrated in FIG. 21. The training data LD in FIG. 22 is the same as the training data LD described above with reference to FIG. 12 except that a value of at least one item in the training data indicates a profile of temporal changes in physical property values. Duplicate descriptions are omitted to avoid redundancy.

As illustrated in FIG. 22, the training data LD includes multiple pieces of training data LD1 to LD1000. Processing liquid information includes a processing liquid concentration profile and a processing liquid temperature profile. The processing liquid concentration profile indicates a temporal change in the concentration of the processing liquid used for a learning target substrate WL. The processing liquid temperature profile indicates the temporal change in the temperature of the processing liquid used for the learning target substrate WL.

In training data LD1, Lbp1 indicates the concentration profile of a processing liquid supplied to a learning target substrate WL1. Lbq1 indicates the temperature profile of the processing liquid supplied to the learning target substrate WL1.

The same applies to the training data LD2 to LD1000. The results of the sublimation drying processes on the learning target substrates WL greatly fluctuate according to the concentration change and the temperature change of the processing liquids for the learning target substrates WL. Preferably, the training data LD includes items that greatly contribute to fluctuations in the results of the sublimation drying processes on the learning target substrates WL.

In the above description with reference to FIGS. 1 to 22, at least one of both the substrate information and the processing liquid information is entered as input information in the trained model LM, and the sublimation drying process condition information is output from the trained model LM. However, the present embodiment is not limited to this. In addition to at least one of both the substrate information and the processing liquid information, part of the sublimation drying process condition information may be entered as input information in the trained model LM, and other sublimation drying process condition information may be output from the trained model LM.

Figure 23:
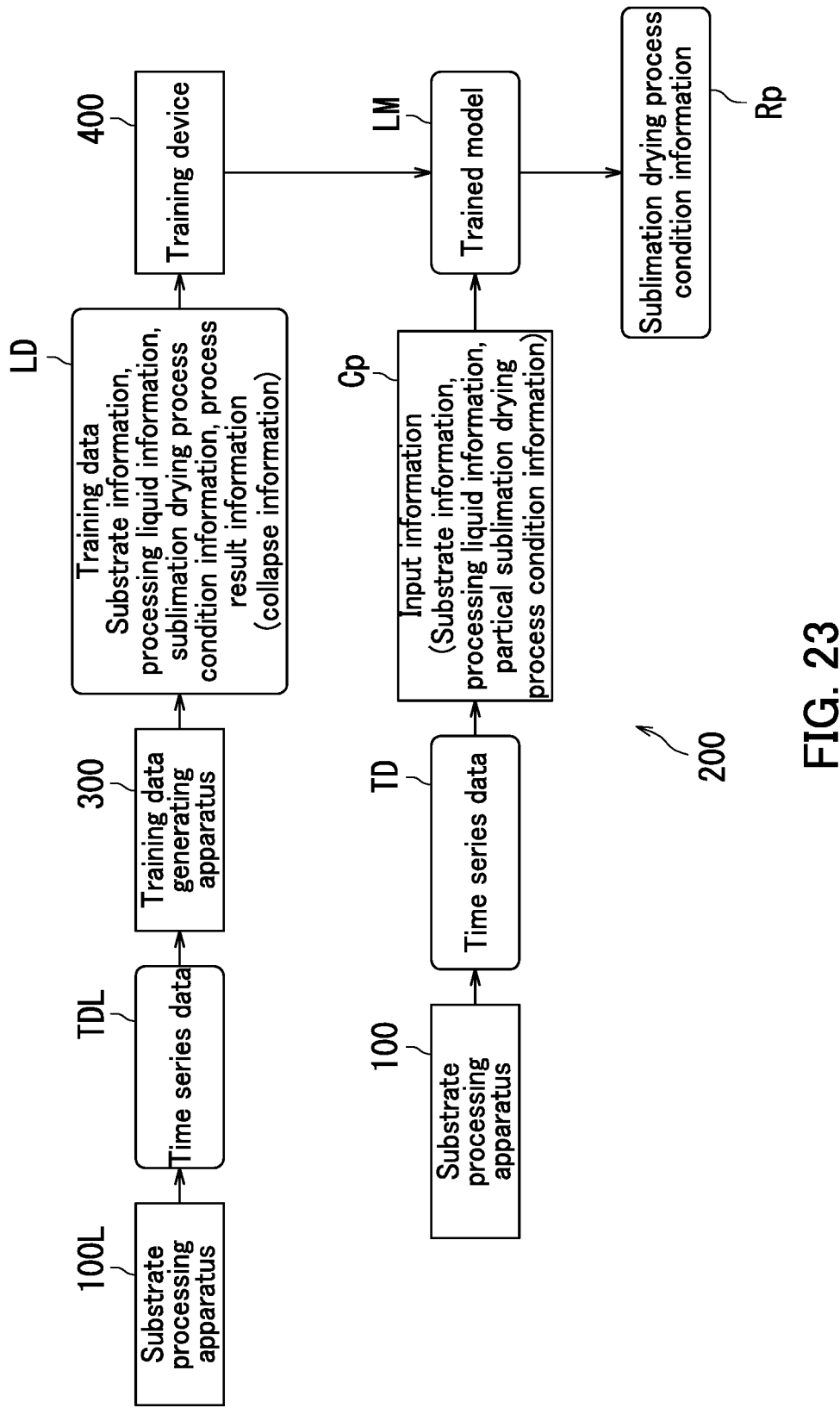
FIG. 23 is a schematic diagram of a substrate processing learning system provided with the substrate processing apparatus according to the present embodiment.

Next, a substrate processing learning system 200 including the substrate processing apparatus 100 according to the present embodiment will be described with reference to FIG. 23. FIG. 23 is a schematic diagram of the substrate processing learning system 200. The substrate processing learning system 200 of FIG. 23 has the same configuration as the substrate processing learning system 200 of FIG. 1 except that part of sublimation drying process condition information is included in input information in addition to at least one of both the substrate information and the processing liquid information from the time series data TD of the substrate processing apparatus 100. Duplicate descriptions are omitted to avoid redundancy.

As illustrated in FIG. 23, a substrate processing apparatus 100L outputs time series data TDL. The time series data TDL is data indicating a temporal change in a physical quantity in the substrate processing apparatus 100L.

A training data generating apparatus 300 generates training data LD based on the time series data TDL or at least part of the time series data TDL. The training data generating apparatus 300 outputs the training data LD.

A training device 400 performs machine learning on the training data LD, thereby generating a trained model LM. The training device 400 outputs the trained model LM.

A substrate processing apparatus 100 outputs time series data TD. The time series data TD is data indicating a temporal change in a physical quantity in the substrate processing apparatus 100.

Input information Cp about a process target substrate Wp is generated from the time series data TD. The input information Cp on the process target substrate Wp is information on the process target substrate Wp and includes at least one of both substrate information and processing liquid information, and a partial sublimation drying process condition that is part of sublimation drying process condition (partial sublimation drying process condition information).

The substrate information on the process target substrate Wp indicates an attribute or a forming condition of grooves and structures in the process target substrate Wp. The processing liquid information indicates an attribute of a processing liquid used for the sublimation drying process performed on the process target substrate Wp. The partial sublimation drying process condition information indicates a condition of the partial sublimation drying process which is part of the sublimation drying process. The partial sublimation drying process is preferably at least part of the first half of the entire sublimation drying process. It is assumed that the sublimation drying process includes, for example, processing liquid supply, solid formation, and sublimation as illustrated in FIG. 5A. In this case, the partial sublimation drying process included in the input information Cp is preferably a partial condition of either the process liquid supply or the solid formation.

Based on the input information Cp on the process target substrate Wp, the trained model LM outputs the sublimation drying process condition information Rp indicating the sublimation drying process condition suitable for the process target substrate Wp in the substrate processing apparatus 100. In this case, the sublimation drying process condition information Rp indicates process conditions other than the partial sublimation drying process condition of the sublimation drying process condition. The sublimation drying process is then performed according to the sublimation drying process condition indicated in the sublimation drying process condition information Rp. In this way, the input information entered in the trained model LM may include at least one of both the substrate information and the processing liquid information as well as the partial sublimation drying process condition information. The trained model LM may output the sublimation drying process condition information indicating the condition for the subsequent sublimation drying process.

Note that the temperature of the substrate W fluctuates in the sublimation drying process. For example, after the processing liquid is supplied to the substrate W, the temperature of the substrate W decreases while the solvent evaporates from the processing liquid. The temperature of the substrate W then rises while the substance to sublime is solidified. The behavior of the substrate W in the sublimation drying process can therefore be grasped more accurately by measuring the temperature of the substrate W.

It is therefore preferable that the substrate processing apparatus 100 measures therein the temperature of the substrate W in the sublimation drying process. For example, the temperature of the substrate W may be measured in a contact manner or in a contactless manner.

Figure 24:
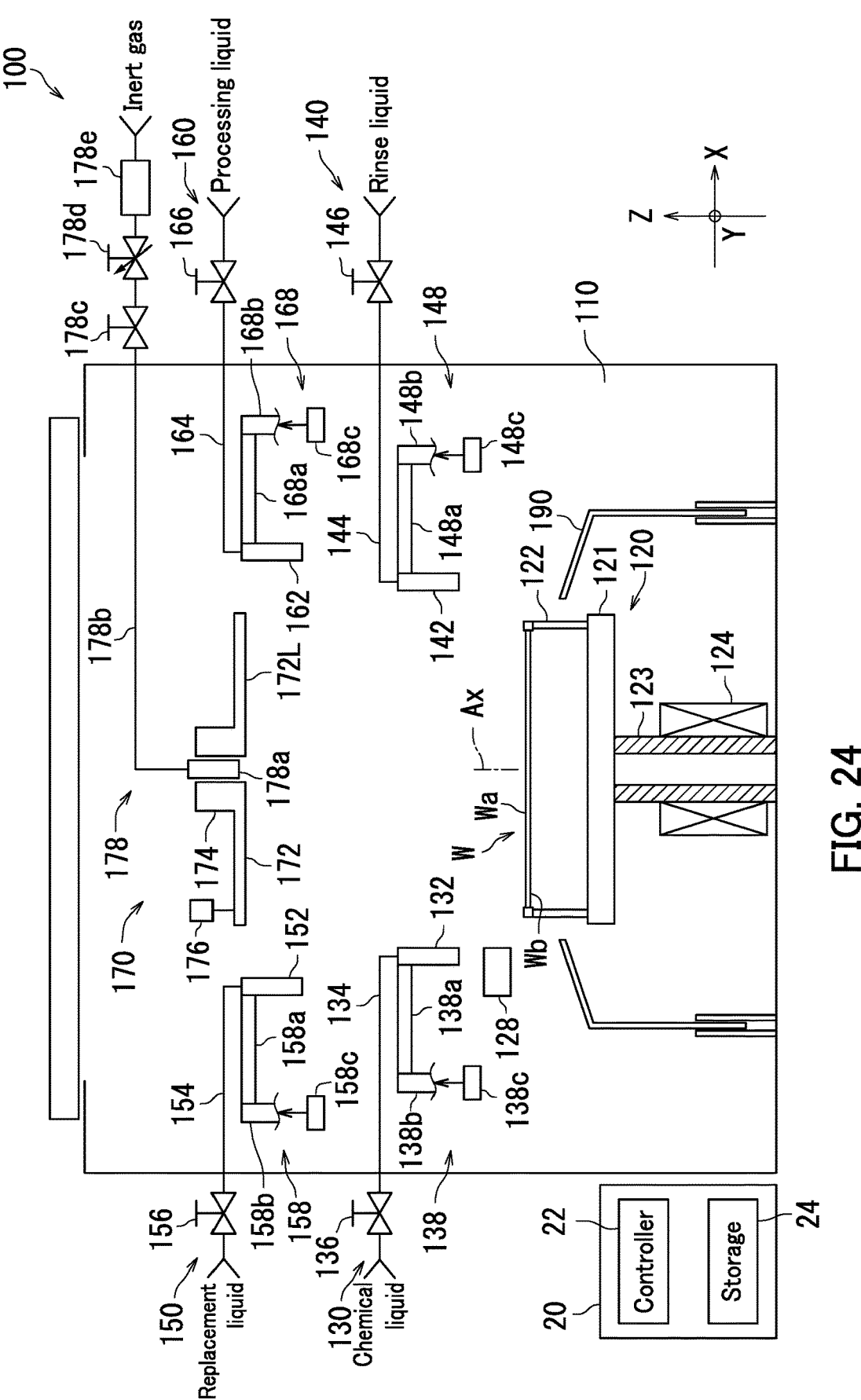
FIG. 24 is a schematic diagram of a substrate processing apparatus according to the present embodiment.

Next, a substrate processing apparatus 100 according to the present embodiment will be described with reference to FIG. 24. FIG. 24 is a schematic diagram of the substrate processing apparatus 100. The substrate processing apparatus 100 of FIG. 24 has the same configuration as the substrate processing apparatus 100 of FIG. 3 except that a temperature measuring section 128 that measures the temperature of a substrate W is further provided. Duplicate descriptions are omitted to avoid redundancy.

The substrate processing apparatus 100 further includes the temperature measuring section 128 as illustrated in FIG. 24. The temperature measuring section 128 measures the temperature of the substrate W. The temperature measuring section 128 measures the temperature of the substrate W in a contact manner or in a contactless manner.

For example, the temperature measuring section 128 measures the temperature of the substrate W in a sublimation drying process. The temperature of the substrate W fluctuates in the sublimation drying process. Measuring the temperature of the substrate W enables an accurate grasp of the behavior inside the substrate W in the sublimation drying process.

Next, training data LD used in a training method according to the present embodiment will be described with reference to FIG. 25. FIG. 25 illustrates an example of the training data LD. The training data LD in FIG. 25 is preferably used to generate a trained model LM of the substrate processing apparatus 100 illustrated in FIG. 24. The training data LD in FIG. 25 is the same as the training data LD described above with reference to FIG. 18 except that a sublimation drying process condition includes a substrate temperature in addition to a processing liquid supply amount, an ejecting pattern of processing liquid, a rotation speed of a learning target substrate WL, and the flow rate of an inert gas. Duplicate descriptions are omitted to avoid redundancy.

As illustrated in FIG. 25, the training data LD includes multiple pieces of training data LD1 to LD1000. The sublimation drying process conditions indicate a processing liquid supply amount, a processing liquid ejecting pattern, a substrate temperature, a rotation speed profile of a learning target substrate WL, and a flow rate profile of an inert gas.

The training data LD1 is information on a learning target substrate WL1 and indicates substrate information, processing liquid information, a sublimation drying process condition, and a process result. Here, in the learning data LD1, Lsv1 indicates the supply amount of a processing liquid used for the sublimation drying process on the learning target substrate WL1. Lsi1 indicates a temporal change in the position of the nozzle of the processing liquid supply section

160L with respect to the learning target substrate WL1. Lst1 indicates a temporal change in the temperature of the learning target substrate WL1 in the sublimation drying process. Lsr1 indicates a profile of a temporal change in the rotation speed of the learning target substrate WL1 in the sublimation drying process. Lsn1 indicates a profile of a temporal change in the flow rate of an inert gas supplied to the learning target substrate WL1 in the sublimation drying process. The same applies to the learning data LD2 to LD1000.

A trained model LM is generated using such training data LD. In this case, in addition to substrate information and processing liquid information, input information about the process target substrate Wp may include information indicating a processing liquid supply amount, an ejecting pattern of processing liquid, and substrate temperature in the period of time up to solid formation in a sublimation drying process. The processing liquid supply amount, the ejecting pattern of processing liquid, and the substrate temperature are also part of the sublimation drying process condition. Even in this case, the sublimation drying process condition information corresponding to the input information can be output from the trained model LM. At this time, the process may be performed during the remaining period of time in the sublimation drying process according to the sublimation drying process condition indicated in the sublimation drying process condition information. For example, the rotation of the process target substrate Wp and the supply of the inert gas in the sublimation process illustrated in Step S43 in FIG. 5A may be performed according to the sublimation drying process condition.

In the above description with reference to FIGS. 1 to 25, the storage 24 of the substrate processing apparatus 100 or the storage 424 of the training device 400 stores the trained model LM constructed by machine learning. However, the present embodiment is not limited to this. The storage 24 of the substrate processing apparatus 100 or the storage 424 of the training device 400 may store a conversion table CT instead of the trained model LM.

Next, a substrate processing apparatus 100 according to the present embodiment will be described with reference to FIG. 26. The substrate processing apparatus 100 in FIG. 26 has the same configuration as the substrate processing apparatus 100 described above with reference to FIG. 4 except that storage 24 stores a conversion table CT instead of the trained model LM. Duplicate descriptions are omitted to avoid redundancy.

Figure 26:
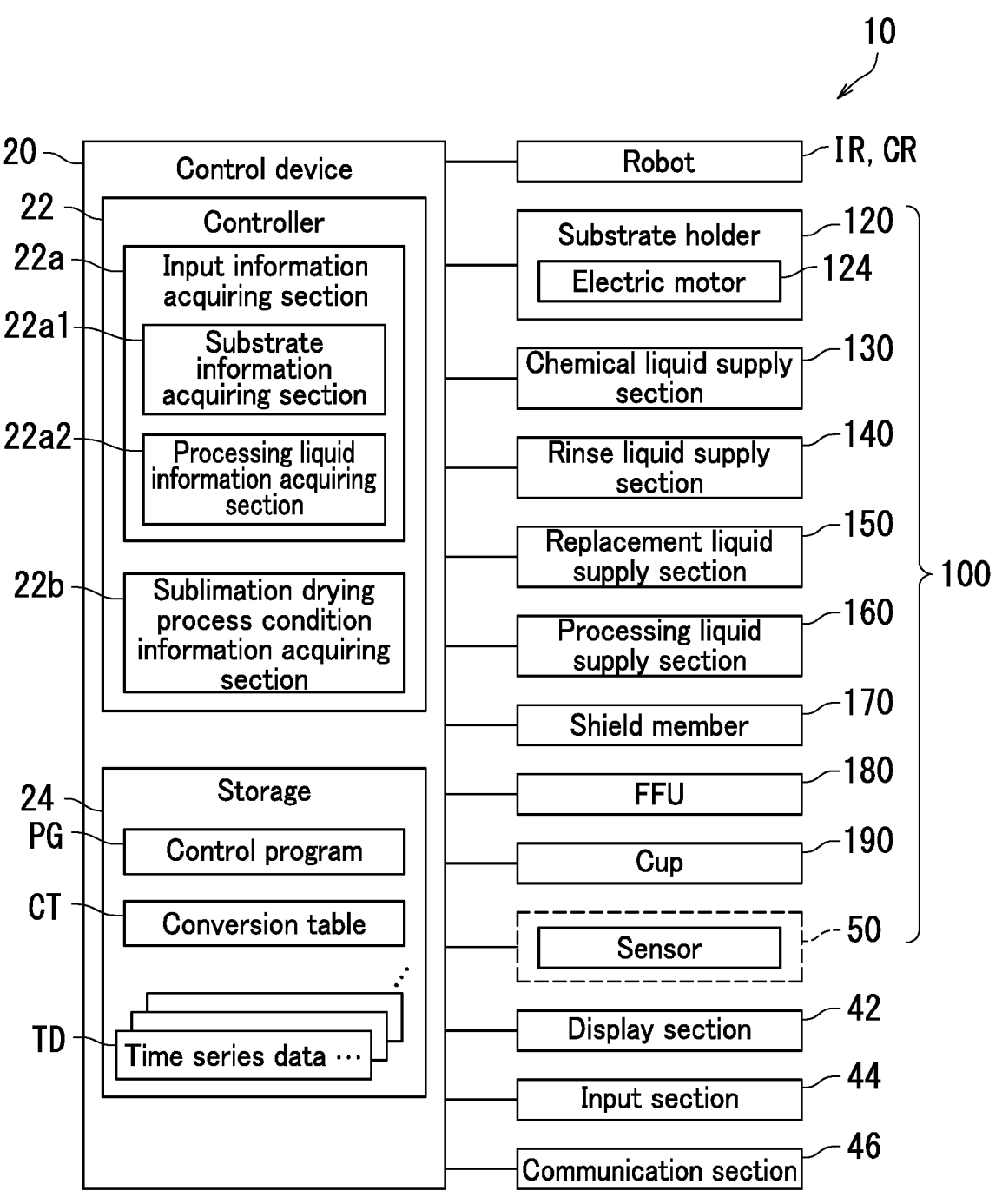
FIG. 26 is a block diagram of a substrate processing apparatus according to the present embodiment.

In the substrate processing apparatus 100 illustrated in FIG. 26, the storage 24 stores the conversion table CT. The conversion table CT associates substrate information, processing liquid information, and sublimation drying process condition information on process target substrates Wp.

The substrate information on a process target substrate Wp may be substrate attribute information or pattern forming condition information on the process target substrate Wp, for example. The processing liquid information on the process target substrate Wp includes processing liquid attribute information indicating an attribute of a processing liquid. Note that the conversion table CT is created based on substrate information, processing liquid information, sublimation drying process condition information, and process result information on learning target substrates WL.

A substrate information acquiring section 22a1 acquires the substrate information from the storage 24. For example, the substrate information acquiring section 22a1 acquires substrate attribute information or pattern forming condition information from the storage 24.

A processing liquid information acquiring section 22a2 acquires processing liquid information from the storage 24. For example, the processing liquid information acquiring section 22a2 acquires the processing liquid attribute information indicating the attribute of a processing liquid from the storage 24.

A sublimation drying process condition information acquiring section 22b acquires sublimation drying process condition information from the substrate information and the processing liquid information based on the conversion table CT. Typically, the sublimation drying process condition information acquiring section 22b extracts respective values corresponding to the substrate information and the processing liquid information from the conversion table CT. The sublimation drying process condition information is then acquired based on the relationship between the substrate information, the processing liquid information, and the sublimation drying process condition information that are associated in the conversion table CT. In this manner, the sublimation drying process condition information acquiring section 22b acquires the sublimation drying process condition information corresponding to the substrate information and the processing liquid information from the conversion table CT.

A controller 22 then controls a substrate holder 120 and a processing liquid supply section 160 according to the sublimation drying process condition indicated in the sublimation drying process condition information. Note that the controller 22 may control the substrate holder 120, the processing liquid supply section 160, and a shield member 170 according to the sublimation drying process conditions.

Here, the conversion table CT may be generated by associating the sublimation drying process condition information, and at least one of both the substrate information and the processing liquid information on the process target substrate Wp.

Figure 27:
FIG. 27 is a diagram illustrating a conversion table in the substrate processing apparatus according to the present embodiment.

FIG. 27 illustrates an example of the conversion table CT. As illustrated in FIG. 27, the conversion table CT indicates substrate information, processing liquid information, and sublimation drying process condition on process target substrates Wp. In the conversion table CT, the substrate information includes at least one of both substrate attribute information and pattern forming condition information. Here, the substrate information on the process target substrates Wp includes groove depth information.

In the conversion table CT, the processing liquid information includes processing liquid attribute information. Here, the processing liquid information includes processing liquid concentration information.

A conversion table CT1 indicates a sublimation drying process condition corresponding to certain substrate information and processing liquid information. Here, in the conversion table CT1, Ad1 indicates the depth of grooves in a given process target substrate Wp. Bc1 indicates the concentration of a processing liquid used for the process target substrate Wp. Rp1 indicates a sublimation drying process condition to be performed on the process target substrate Wp. It is assumed that the depth of grooves in the process target substrate Wp is Ad1, and the concentration of the processing liquid is Bc1. In this case, the substrate processing apparatus 100 performs the sublimation drying process according to the sublimation drying process condition indicated by Rp1.

The same applies to the conversion tables CT2-CT1000. Typically, at least one of both the substrate information and the processing liquid information is different for the conversion tables CT1 to CT1000.

The values of the substrate information and the processing liquid information on process target substrates Wp may not match the values indicated in the conversion table CT. In this case, the sublimation drying process condition for the process target substrates Wp may be determined by linear interpolation of the values of the sublimation drying process condition indicated in the conversion table CT. Alternatively, the sublimation drying process condition for the process target substrates Wp may be determined by interpolating the values of the sublimation drying process condition indicated in the conversion table with polynomials.

Embodiments of the present invention are described above with reference to the accompanying drawings. However, the present invention is not limited to the above embodiments and may be implemented in various manners with in a scope not departing from the gist thereof. Furthermore, various inventions may be formed by appropriately combining constituent elements disclosed in the above embodiments. For example, some constituent elements may be removed from all of the constituent elements illustrated in the embodiments. Additionally, constituent elements may be appropriately combined across different embodiments. The drawings mainly illustrate the constituent elements schematically to facilitate understanding thereof. Aspects such as thickness, length, number, and interval of the constituent elements illustrated in the drawings may differ in practice for convenience of drawing preparation. Furthermore, aspects such as material, shape, and dimension of the constituent elements illustrated in the above embodiments are examples and not particular limitations. Various changes can be made without substantially deviating from the effects of the present invention.

INDUSTRIAL APPLICABILITY

The present invention is suitably used for a substrate processing apparatus, a substrate processing method, a training data generating method, a training method, a training device, a trained model generating method, and a trained model.

REFERENCE SIGNS LIST

10 Substrate processing system
20 Control device
22 Controller
22a Substrate information acquiring section
22b Processing liquid information acquiring section
22b Sublimation drying process condition information acquiring section
24 Storage
LM Trained model
100 Substrate processing apparatus
130 Chemical liquid supply section
140 Rinse liquid supply section
150 Replacement liquid supply section
160 Processing liquid supply section
200 Substrate processing learning system
300 Training data generating apparatus
400 Training device

The invention claimed is:
1. A substrate processing method, comprising:
    (a) rotating a process target substrate by a rotatable substrate holder while holding the process target substrate, the process target substrate being provided with a pattern of grooves and structures;

(b) acquiring input information including at least one of substrate information and processing liquid information, the substrate information being information on the process target substrate and indicating an attribute or a forming condition of the grooves and the structures, the processing liquid information indicating an attribute of a processing liquid containing a solvent and a sublimable substance that changes from a solid to a gas at 1 atm without going through a liquid state;

(c) acquiring sublimation drying process condition information from a trained model based on the input information, the sublimation drying process condition information indicating a sublimation drying process condition for the process target substrate;

(d) performing a sublimation drying process on the process target substrate according to the sublimation drying process condition of the sublimation drying process condition information, the sublimation drying process on the process target substrate including a solid formation to form a solid of the sublimable substance from the processing liquid on the process target substrate and a solid sublimation to cause the solid to sublime at 1 atm; and (e) preparing the trained model before step (c) of acquiring the sublimation drying process condition information by performing machine learning on training data, the training data including, in a same record, (A) the substrate information and the processing liquid information, (B) the sublimation drying process condition information, and (C) process result information, the substrate information being information on a learning target substrate provided with the pattern of grooves and structures and indicating the attribute or the forming condition of the grooves and structures, the processing liquid information indicating the attribute of the processing liquid used for performance of the sublimation drying process on the learning target substrate, the processing liquid containing the solvent and the sublimable substance that changes from the solid to the gas at 1 atm without going through a liquid state;

the sublimation drying process condition information indicating a condition by which the sublimation drying process has been performed on the learning target substrate; and the process result information indicating a result of the sublimation drying process that has been performed on the learning target substrate, the sublimation drying process on the learning target substrate including a solid formation to form the solid of the sublimable substance from the processing liquid on the learning target substrate and the solid sublimation to cause the solid to sublime at 1 atm.

2. The substrate processing method according to claim 1, wherein step (d) includes supplying the processing liquid to the process target substrate held by the rotatable substrate holder, the processing liquid containing the solvent and the sublimable substance that changes from the solid to the gas at 1 atm without going through a liquid state.

3. The substrate processing method according to claim 1, wherein, in the step (d), the solid formed of the sublimable substance from the processing liquid on the process target substrate sublimes with the process target substrate held by the rotatable substrate holder.

* * * * *